July 5, 1966 L. R. STRATHMAN 3,259,897
SUPPRESSION NETWORK FOR TRANSPONDER OR SIMILAR APPARATUS
Filed July 29, 1963 16 Sheets-Sheet 16
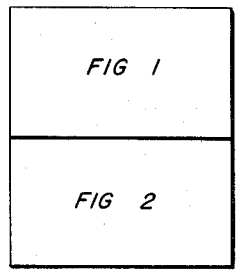
FIG 16
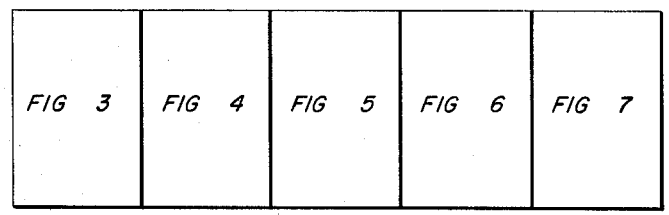
FIG 17
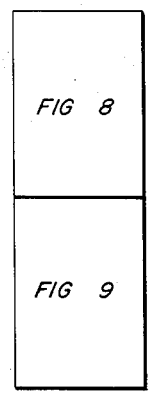  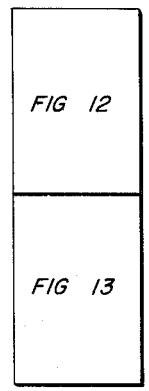 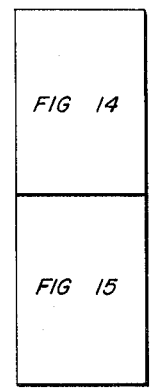
FIG 18  FIG 19  FIG 20  FIG 21
INVENTOR.
LYLE R. STRATHMAN
BY
ATTORNEYS United States Patent Office 3,259,897
Patented July 5, 1966

3,259,897
SUPPRESSION NETWORK FOR TRANSPONDER
OR SIMILAR APPARATUS
Lyle R. Strathman, Cedar Rapids, Iowa, assignor to Collins Radio Company, Cedar Rapids, Iowa, a corporation of Iowa
Filed July 29, 1963, Ser. No. 298,070
9 Claims. (Cl. 343—6.8)

This invention relates to a suppression network and more particularly to a suppression network for use in a transponder, or similar apparatus, to receive an interrogation coded signal, having either two or three pulses, and preclude a response to said interrogation coded signal unless said pulses are timewise spaced in a predetermined manner and have a predetermined relative amplitude relationship.

An interrogation radar transmitter system, when utilized in conjunction with a transponder, or similar apparatus, transmits a coded signal consisting of a train of timewise spaced pulses. In presently used systems, this train of pulses may consist either of two pulses, one of which (a control pulse) is radiated from a non-directional antenna and the other of which (a trigger pulse) is radiated from a directional antenna, or three pulses, two of which (trigger pulses) are radiated from the directional antenna and the other of which (control pulse) is radiated from the nondirectional antenna.

In the presently utilized two pulse system, the control pulse precedes the trigger pulse by a predetermined time increment, while in the three pulse system, the trigger pulses are timewise spaced a predetermined increment equal to the time spacing between the pulses of the two pulse system with the control pulse occurring shortly after the first trigger pulse (but well before the second trigger pulse). The time increment between the first and last pulses in either system is determined by the particular mode of operation, and presently utilized systems provide a plurality of selectable modes.

The coded signal generated by the interrogation radar transmitter system is received by the transponder and coupled to the suppression network therein where the relative amplitudes of the pulses are compared as well as the spacing between pulses. If the pulses of the interrogation coded signal have the proper relative amplitudes and are properly spaced (for the mode selected), an output signal will be produced by the suppression network to cause the transponder to transmit a reply signal.

The interrogation radar transmitting system may, for example, be positioned on the ground while the transponder may be mounted in an aircraft and be utilized either for identification purposes or for deriving other information such as the altitude or bearing of the aircraft.

Since the transponder is triggered, or caused to transmit a reply, in response to interrogation coded signals, care must be taken to prevent false, or spurious, triggering of the transponder. Such undesired triggering of the transponder is usually caused by a coded signal that includes a trigger pulse (or pulses if a three pulse system) from a side lobe of the directionally radiating antenna of the interrogation radar system, although undesired triggering has also been known to occur due to echoes. Undesirable trigger pulses of this type, however, are smaller in magnitude and hence may be detected by careful consideration of the relative amplitude relationships between pulses.

This relative amplitude characteristic has been utilized heretofore in devices of this type to provide means for preventing undesirable triggering of a transponder due to trigger pulses originating from the side lobe of the directionally radiating antenna of the interrogation radar system. Such a side lobe suppression network is taught and claimed, for example, in United States Patent No. 3,032,757, issued May 1, 1962, to John B. Majerus and Floyd M. Totten, and assigned to the assignee of the present invention. The transponder of that invention, however, while being capable of receiving either a two pulse or a three pulse coded signal, does not teach a system capable of handling a three pulse coded signal wherein the control pulse timewise closely follows the first trigger pulse.

Another such side lobe suppression network is taught and claimed in United States patent application Serial No. 92,956, filed March 2, 1961, by John B. Majerus and Norton S. Most (now Patent No. 3,176,291, dated March 20, 1965), and also assigned to the assignee of the present invention. That application, while teaching a network capable of receiving a three pulse coded signal wherein the control pulse timewise closely follows the first trigger pulse, teaches, however, a system for receiving only a three pulse coded signal.

It is therefore an object of this invention to provide a transponder having an improved suppression network capable of handling either a two pulse or a three pulse coded signal wherein the first pulse and the last pulse are spaced a predetermined time interval and the third pulse, if occurring, timewise closely follows said first pulse, and precluding a reply by the transponder unless all pulses of the received coded signal are properly spaced and have a predetermined relative amplitude relationship.

More particularly, it is an object of this invention to provide an improved suppression network for receiving either a two pulse or a three pulse coded signal that includes first pulse analyzing means for receiving the coded signal and passing only two pulses thereof at least one of which is the pulse originating from the directionally radiating antenna, delay means for receiving the two pulse output from the first pulse analyzing means and delaying the same for a predetermined time interval, amplitude reduction means for receiving the delayed pulses from the delay means and reducing the amplitude of the pulses by a predetermined amount, and second pulse analyzing means connected to the amplitude reduction means for receiving the delayed pulses therefrom and to the first pulse analyzing means for receiving the pulses therefrom substantially undelayed, said second pulse analyzing means precluding an output from the network unless the received pulses are timewise spaced said predetermined time interval and unless the pulse originating from the directionally radiating antenna has an amplitude greater than that of said reduced amplitude delayed pulses.

It is another object of this invention to provide a side lobe suppression network for receiving either a two pulse or a three pulse coded signal, which network includes means for automatically determining the mode of transmission of the interrogation radar system and replying in the same mode.

It is yet another object of this invention to provide a transponder having a suppression network that includes means for causing a charged capacitor to be discharged linearly to enhance pulse comparison.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate one complete embodiment of the invention constructed according to the best mode so far devised for the practical application of the principles thereof, and in which:

FIGURES 1 and 2 taken together constitute a block diagram of the suppression network of this invention;

FIGURES 3 through 7 taken together constitute a schematic diagram of the suppression network of this invention illustrating a single mode of operation;

FIGURES 8 and 9 present a series of typical waveforms illustrating the operation of this invention when a three pulse coded signal is received wherein the trigger pulses originate from the main lobe of the directionally radiating antenna;

FIGURES 10 and 11 present a series of typical waveforms illustrating the operation of the network of this invention when a three pulse coded signal is received wherein the trigger pulses originate from a side lobe of the directionally radiating antenna;

FIGURES 12 and 13 present a series of typical waveforms illustrating the operation of this invention when a two pulse coded signal is received wherein the trigger pulse is from the main lobe of a directionally radiating antenna;

FIGURE 16 illustrates the proper placement of FIGURES 1 and 2 for viewing the entire block diagram of the suppression network of this invention;

Figure 1:
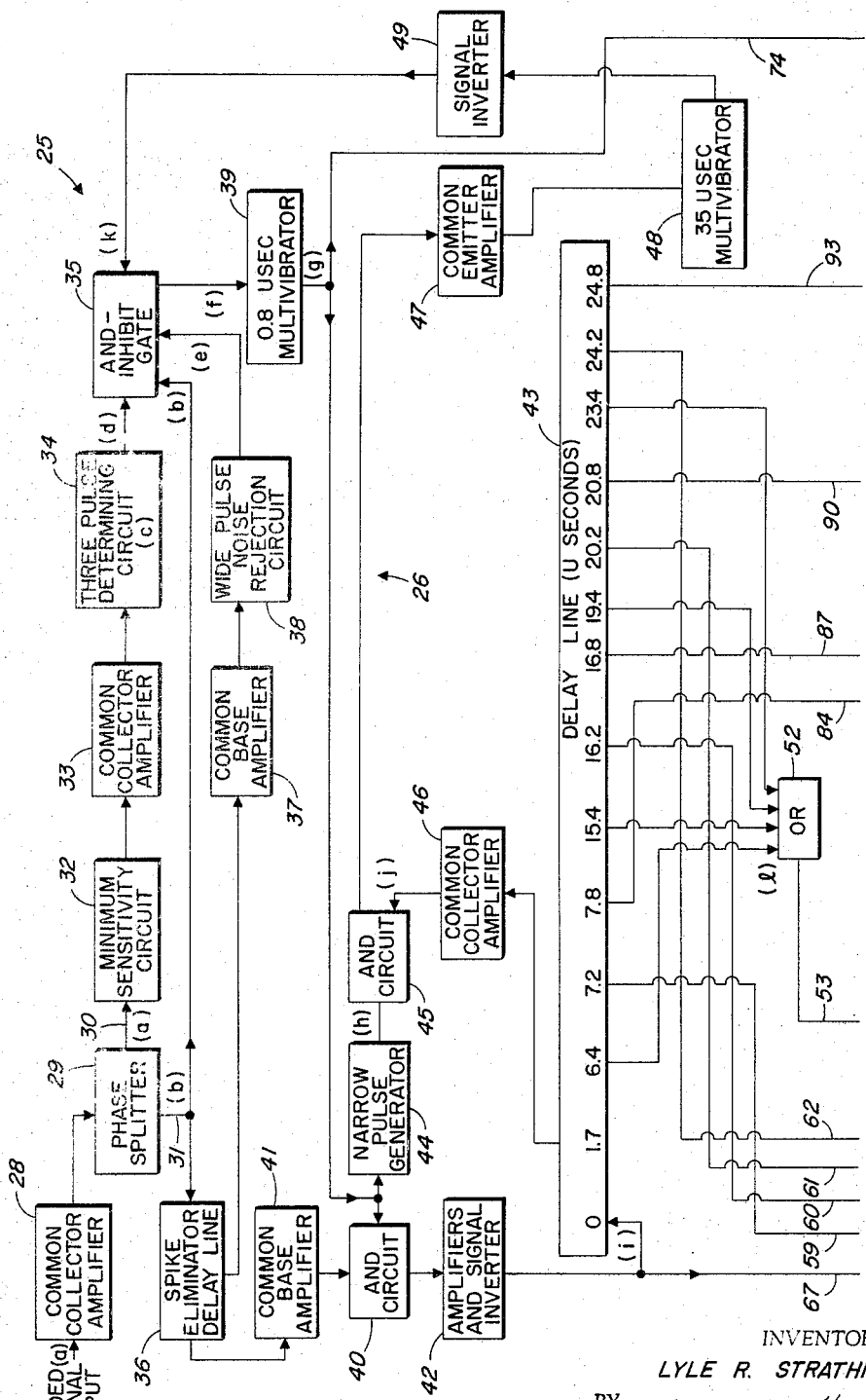

FIGURE 17 illustrates the proper placement of FIGURES 3 through 7 for viewing the entire schematic diagram of the suppression network of this invention; and FIGURES 18 through 21 illustrate the proper placement of FIGURES 8 through 15 for viewing the typical waveforms presented therein.

Referring now to the drawings in which like numerals have been used for like characters throughout, the numeral 25 indicates generally the side lobe suppression network of this invention having a first pulse analyzing circuit 26 (see FIGURE 1) for determining the presence of a three pulse coded signal and elimination of one pulse thereof, and a second pulse analyzing circuit 27 (see FIGURE 2) for determining coincidence and relative pulse strengths of the two pulses coupled through the first pulse analyzing circuit.

The first pulse analyzing means 26 is depicted in FIGURE 1 as that circuit which receives the coded input signal as applied to common collector amplifier 28 and provides a two-pulse output train from the amplifiers and signal inverter circuitry 42 (line 67). The first pulse analyzing means is noted to include all of the functional blocks lying generally above the delay line 43 in FIGURE 1. The second pulse analyzing means is generally depicted in the lower portion of FIGURE 2 as the comparison means 66 which receives an output from common collector amplifier 65 and the undelayed output from the first pulse analyzing means (line 67) and in conjunction with related logic circuitry by which the time and amplitude analysis and inhibiting function is performed.

As shown in FIGURE 1, the coded input signal is coupled through common collector amplifier 28 to phase splitter 29 where the coded signal is produced at a first output 30 without a phase shift and at a second output 31 shifted 180° in phase. Thus, if the input coded signal has pulses of negative polarity (as will be assumed throughout for illustrative purposes), pulses of this polarity will be produced at phase splitter output 30 while pulses of positive polarity will be produced at phase splitter output 31.

Phase splitter output 30 is connected through minimum sensitivity circuit 32 and common collecter amplifier stages 33 to three pulse determining circuit 34. As brought out more fully hereinafter, three pulse determining circuit 34 determines the presence of the third, or middle occurring, pulse (the control pulse occurring shortly after the first trigger pulse when a three pulse coded signal is received) and compares the amplitude of the third pulse, if present, with that of the first pulse and either eliminates the third pulse or allows it to pass depending upon the relative amplitudes of these pulses.

The output pulses from three pulse determining circuit 34 are coupled to AND-INHIBIT gate 35, which gate receives four inputs, one of which (the inhibiting input), while received, precludes an output from the gate. An input is also coupled to AND-INHIBIT gate 35 directly from output 31 of phase splitter 29, while the last input is coupled from output 31 of phase splitter 29 through spike eliminator delay line 36, common base amplifier 37, and wide pulse noise rejection circuit 38.

Whenever the three AND inputs (exclusive of the INHIBIT input) are received coincidently (and with the same polarity), a pulse is coupled from AND-INHIBIT gate 35. As will be brought out more fully hereinafter, the output from AND-INHIBIT gate 35 will always consist of two pulses for any input coded signal since even if a three pulse coded signal is received, either the control pulse or the last trigger pulse is eliminated.

The two pulse output from AND-INHIBIT gate 35 is coupled to 0.8 microsecond monostable multivibrator 39 (where the pulses are precisely shaped to be 0.8 microsecond in duration) and then to AND circuit 40. This circuit also receives an output from spike eliminator delay line 36 through common base amplifier 41. Thus, the pulse train coupled through AND circuit 40 will be accurately controlled both as to width and amplitude and limited to never more than two pulses. The output from AND circuit 40 is then coupled through amplifier and signal inverter stages 42 to delay line 43.

The output from 0.8 microsecond multivibrator 39 is also coupled through narrow pulse generator 44 to AND circuit 45, which AND circuit receives a second input (through amplifier 46) tapped from the delay line at a time so that the first trigger pulse and the control pulse (if received) will be coincident. If coincidence occurs, an output is produced from AND circuit 45 and coupled through common emitter amplifier 47 to 35 microsecond suppressor multivibrator 48.

Thirty-five microsecond monostable multivibrator 48 produces a blanking output signal which is inverted in polarity by signal inverter 49 and then coupled to AND-INHIBIT gate 35 as the INHIBIT input. This, of course, precludes any output from the AND-INHIBIT gate until such time as the multivibrator ceases to produce the blanking voltage (i.e., after 35 $\mu$seconds).

Thus, if the control pulse of a received three pulse coded signal is not eliminated at three pulse determining circuit 34, blanking multivibrator 48 will be energized to suppress the last trigger pulse (which always occurs within 35 microseconds after the control pulse regardless of the mode selected). If, of course, the control pulse was eliminated in circuit 34, or if only two pulses are received, then multivibrator 48 will not be energized and the last pulse will not be eliminated.

Figure 2:
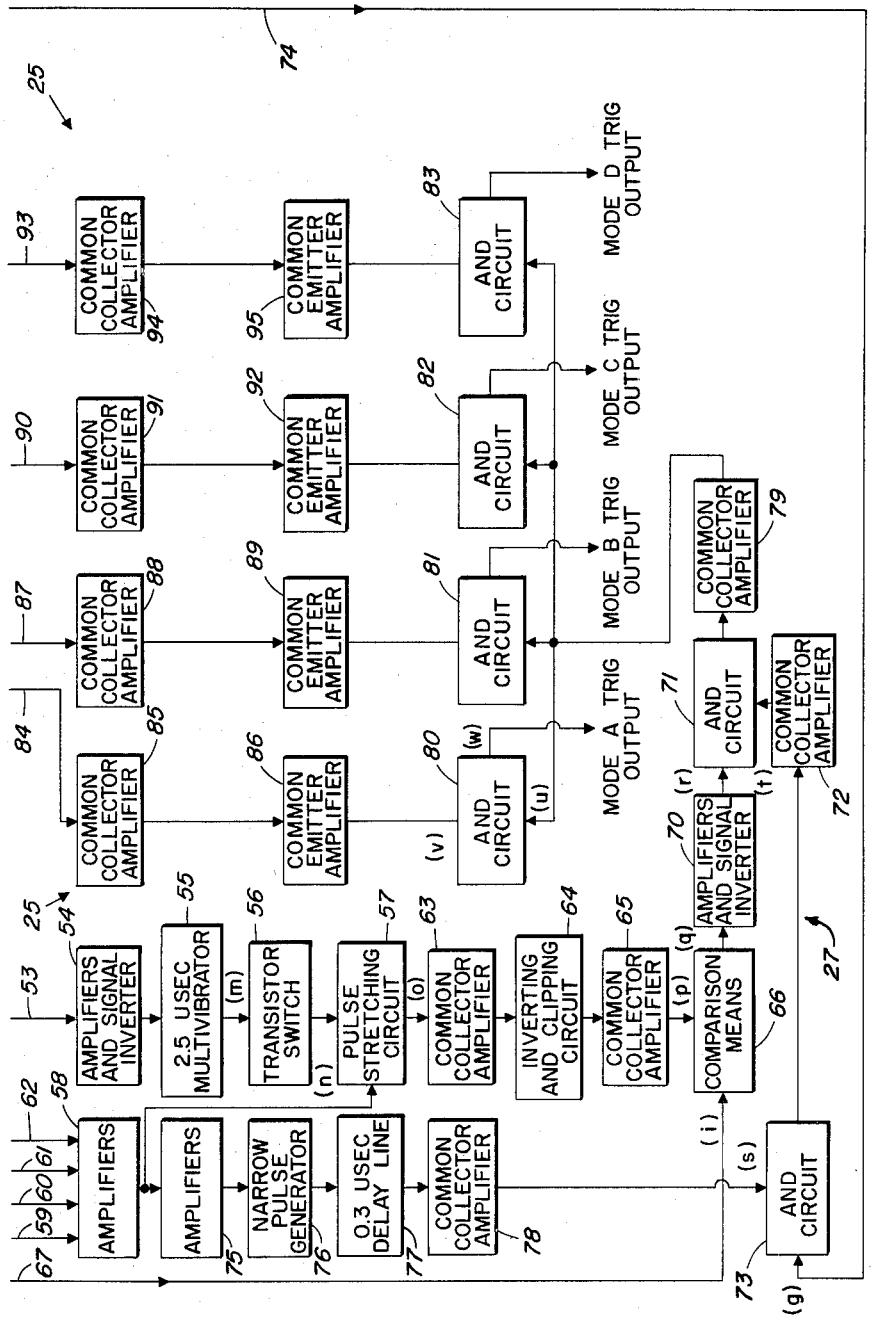

As brought out hereinabove, transponder systems must be capable of operation in several modes determined by the spacing between the first and last pulses. As shown in FIGURES 1 and 2, four such modes are provided, as is conventional, mode A having a spacing (between the first and last pulses) of 8 $\mu$seconds, mode B having a spacing of 17 $\mu$seconds, mode C having a spacing of 21 $\mu$seconds, and mode D having a spacing of 25 $\mu$seconds. It is to be realized, however, that the modes indicated herein, while conventional, are not meant to be restrictive as to the principles of this invention.

As shown in FIGURE 1, delay line 43 is tapped at 6.4 microseconds for mode A operation, at 15.4 microseconds for mode B operation, at 19.4 microseconds for mode C operation, and at 23.4 microseconds for mode D operation. All of these taps are connected to OR circuit 52 and the output from OR circuit 52 is coupled through lead 53 and amplifier and signal inverting stages 54 (see FIGURE 2) to 2.5 microsecond monostable multivibrator 55.

Multivibrator 55 fires, or becomes operative, in response to each pulse, and thereafter produces a pulse that is 2.5 microseconds in width. Thus, if the two trigger pulses of a three pulse coded signal, or the control and trigger pulses of a two pulse coded signal, are coupled to multivibrator 55, two pulses substantially 2.5 microseconds in width will be generated with the leading edges spaced a time interval equal to that of the input pulses. However, if the trigger and control pulses from a three pulse coded signal are coupled to multivibrator 55, then only a single pulse will be generated since the control pulse will occur during the 2.5 microseconds that the multivibrator is operative due to the trigger pulse input.

As shown in FIGURE 2, the output from 2.5 microsecond multivibrator 55 is coupled through transistor switch 56 to pulse stretching circuit 57. Pulse stretching circuit 57 receives a second input from amplifier stages 58, which amplifier stages receive an input from delay line 43 tapped at 7.2 microseconds (mode A) through lead 59, tapped at 16.2 microseconds (mode B) through lead 60, tapped at 20.2 microseconds (mode C) through lead 61, and tapped at 24.2 microseconds (mode D) through lead 62.

The stretched pulse output from pulse stretching circuit 57 is then coupled through common collector amplifier 63 to inverting and clipping circuit 64 where the received pulses are reduced in magnitude and inverted in polarity.

The output from inverting and clipping circuit 64 is coupled through common collector amplifier 65 to one input of comparison means (or adder) 66. Comparison means 66 also receives a second input from amplifier and signal inverting stages 42 through lead 67 so that comparison means 66 receives the pulse train as received from the first pulse analyzer substantially undelayed at one input, and receives essentially the same pulse train after delay (the time interval of which is determined by the mode selected), inversion and reduction in amplitude at the other input. It is therefore obvious that the first and last pulses (the first trigger pulse and the second trigger pulse, if not eliminated, in a three pulse signal and the control and trigger pulses in the two pulse signal) are compared. Since the compared pulses are of unlike polarity, a difference output is produced, the polarity as a result of direct comparison being that of the pulse with the larger amplitude. The amount of pulse reduction of the delayed pulses will, of course, determine the minimum amplitude that the last pulse (undelayed from the first pulse analyzer) must attain to produce an output having the same polarity.

The output from comparison means 66 is then coupled through amplifier and signal inverter stages 70 to AND circuit 71. The second input to AND circuit 71 is coupled thereto through amplifier 72, which amplifier receives the output from AND circuit 73. AND circuit 73 receives a first input from 0.8 microsecond multivibrator 39 through lead 74 and a second input from amplifier stages 58 through amplifier stages 75, narrow pulse generator 76, 0.3 microsecond delay line 77, and common collector amplifier 78.

If coincidence occurs between pulses of the same polarity (or portions thereof), then AND circuit 71 will produce an output pulse. The input pulses will, however, be of the same polarity only if the last undelayed pulse coupled to comparison means 66 from the first pulse analyzer was greater in magnitude than the reduced amplitude pulses coupled thereto from amplifier 65.

The output pulse from AND circuit 71 (when produced) is coupled through common collector amplifier 79 to AND circuits 80 (mode A), 81 (mode B), 82 (mode C), and 83 (mode D). Each AND circuit receives a second input from the delay line, the delay line being tapped at 7.8 microseconds for mode A and coupled to AND circuit 80 through lead 84 and amplifiers 85 and 86, at 16.8 microseconds for mode B and coupled to AND circuit 81 through lead 87 and amplifiers 88 and 89, at 20.8 microseconds for mode C and coupled to AND circuit 82 through lead 90 and amplifiers 91 and 92, and at 24.8 microseconds for mode D and coupled to AND circuit 83 through lead 93 and amplifiers 94 and 95.

Since the pulses of a received coded signal will be timewise spaced properly for coincidence at no more than one of the AND circuits 80–83, an output from the suppression network is possible only in one mode, that being the same mode as that of the transmitting interrogation radar system. If the pulses are spaced eight microseconds, for example, and if a pulse is produced at the output of AND circuit 71, then AND circuit 80 will receive a pulse in coincidence with and of the same polarity from AND circuit 71 through amplifier 79 and from delay line 43 through lead 84 and amplifiers 85 and 86. When this occurs, the transponder will be caused to reply in mode A. In like manner if other modes are utilized, the transponder will automatically reply in the proper mode.

Figure 3:
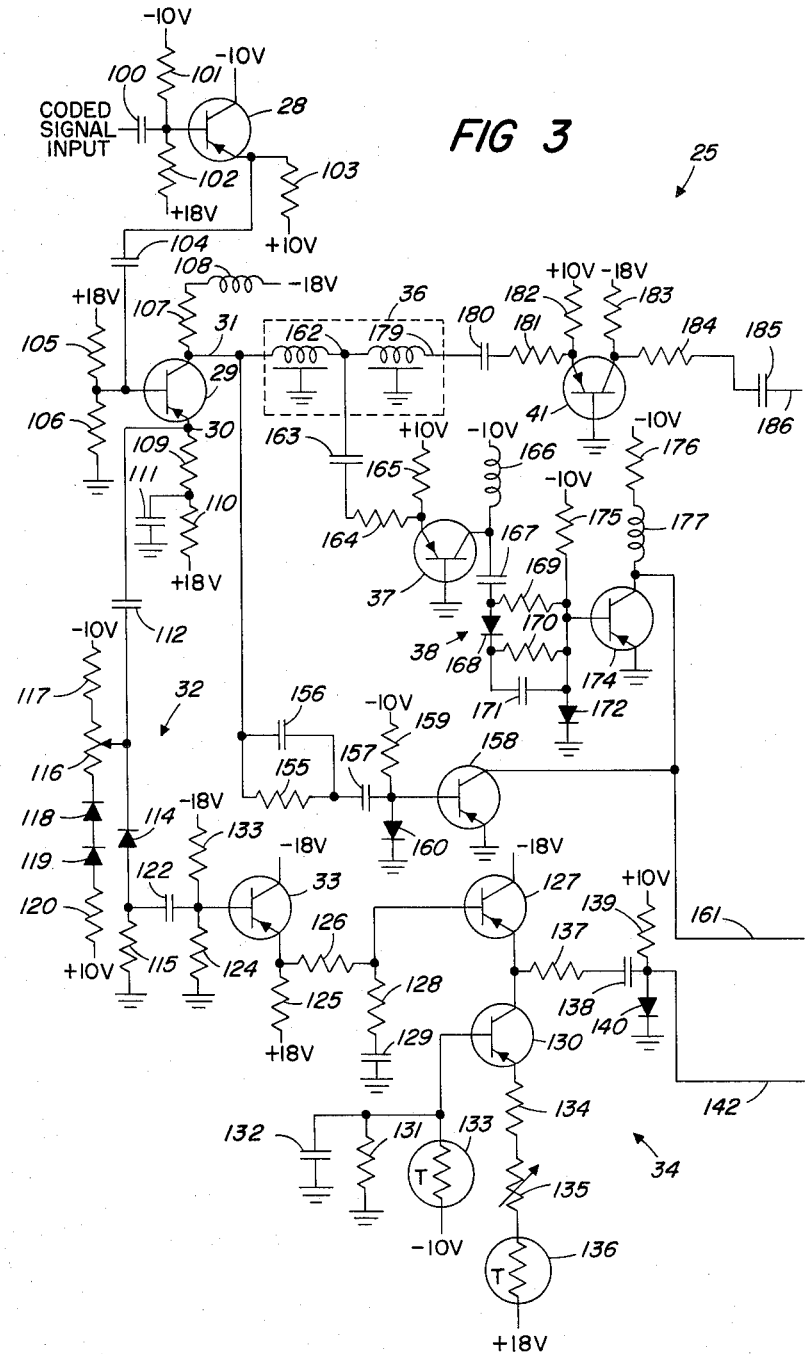
Figure 4:
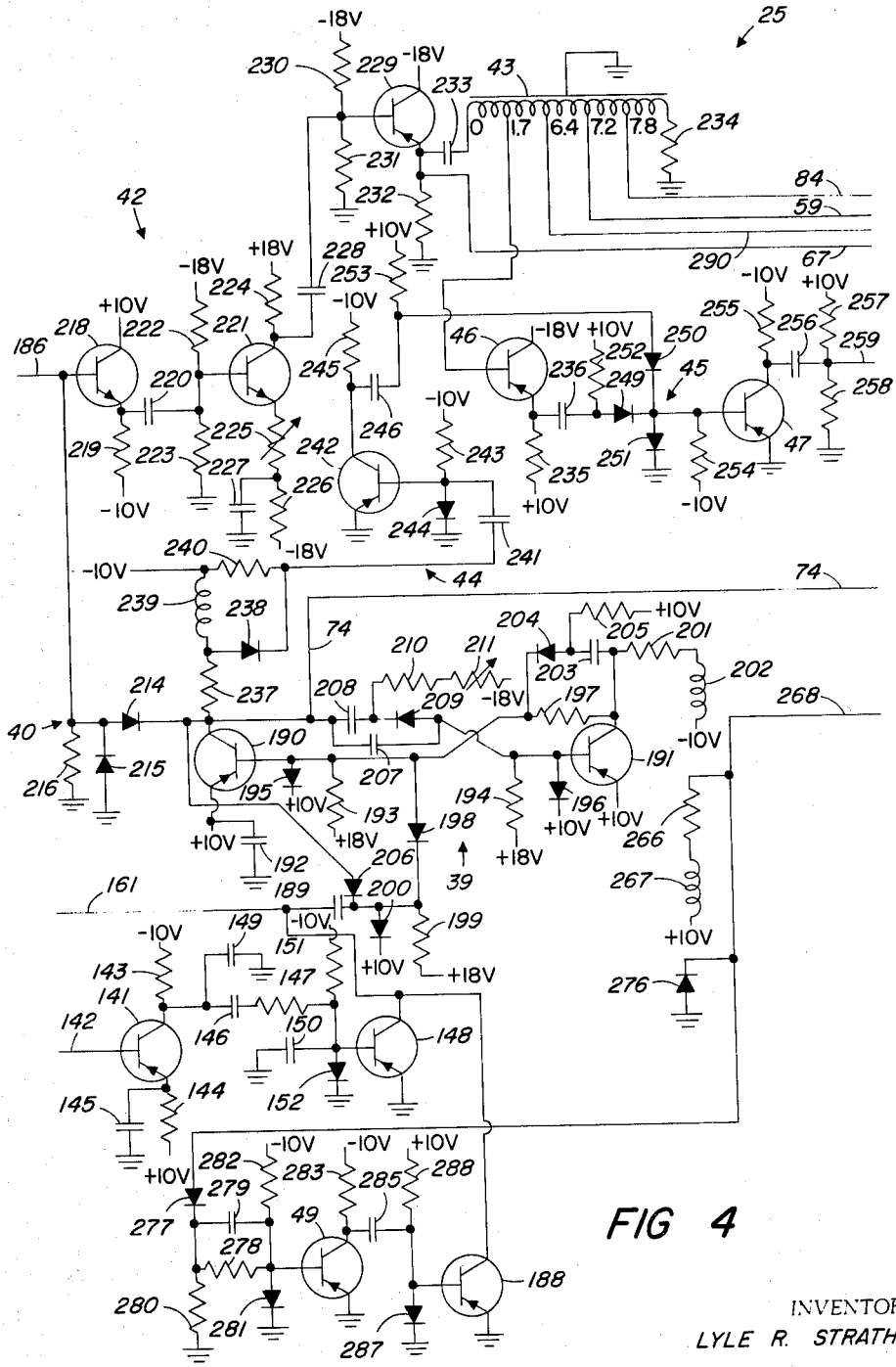
Figure 5:
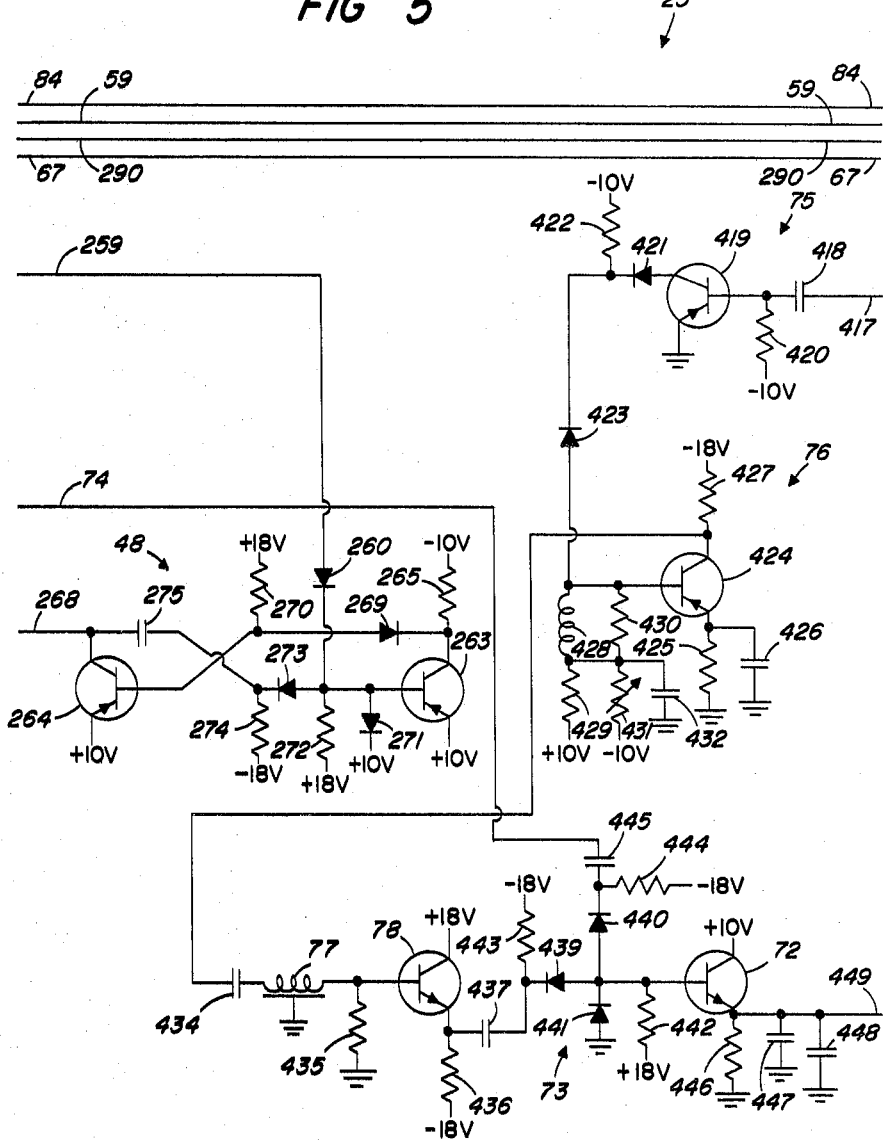
Figure 6:
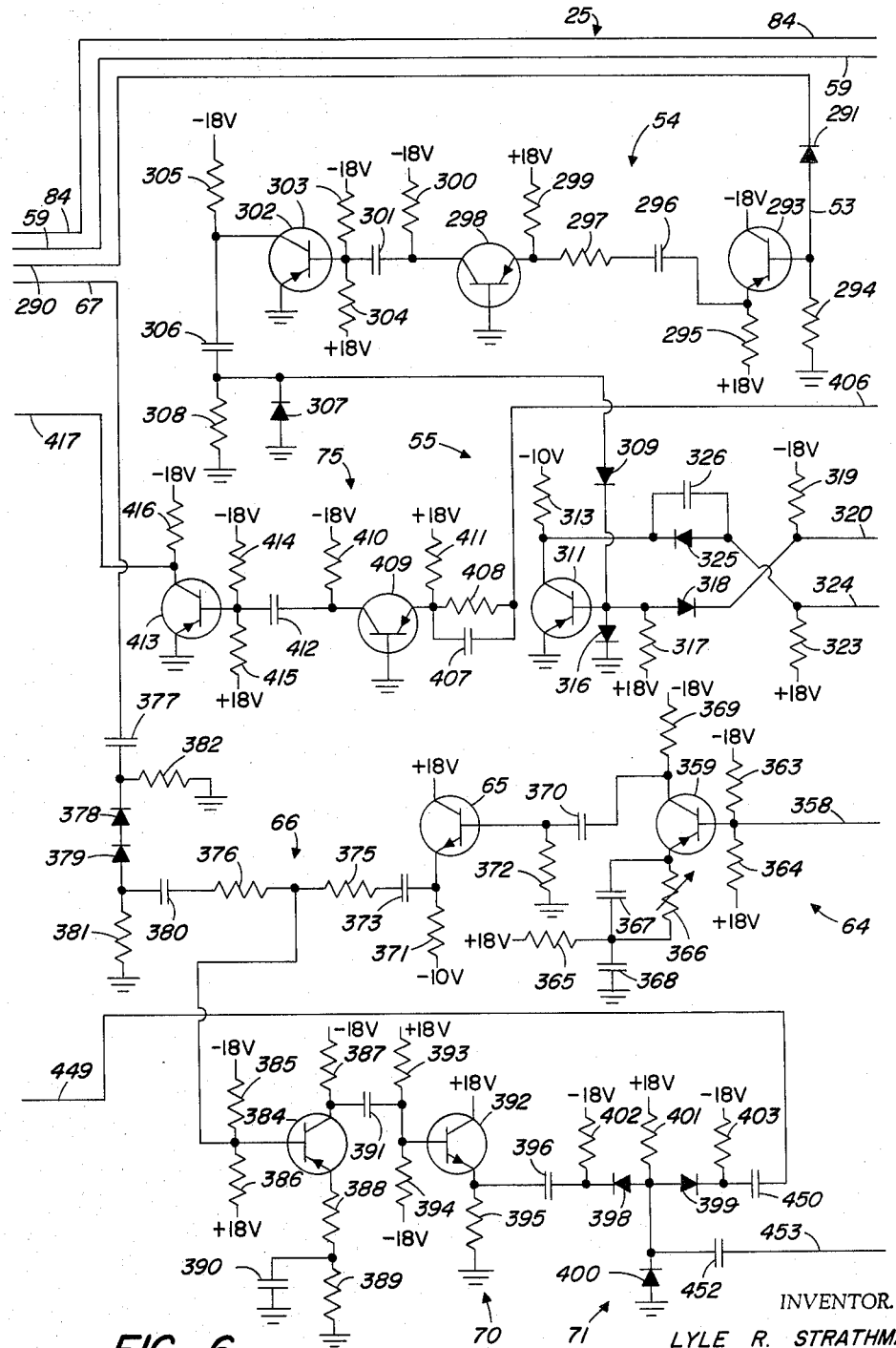
Figure 7:
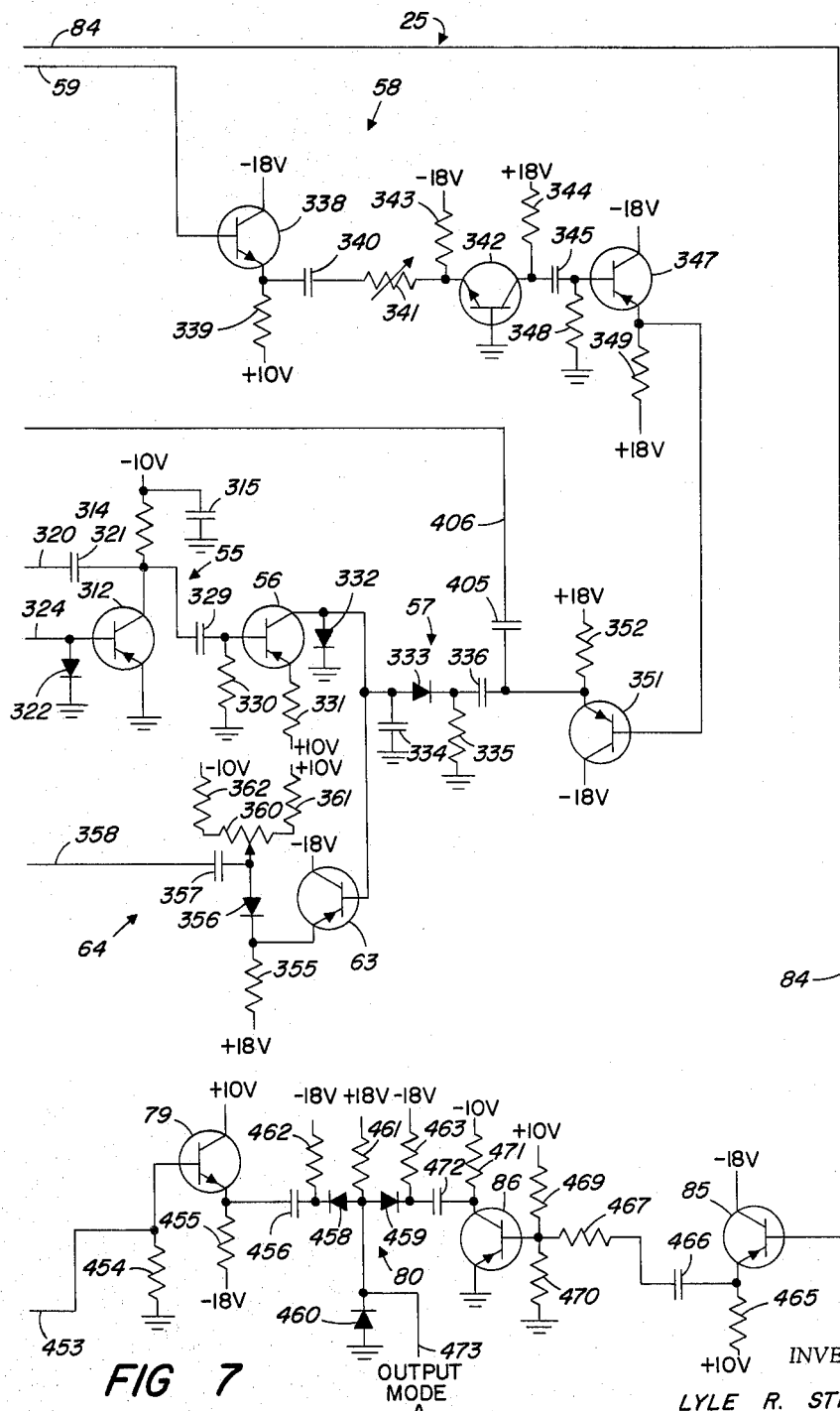

Referring now to the schematic drawings, FIGURE 3 includes generally amplifier 28, phase splitter 29, minimum sensitive circuit 32, amplifier 33, three pulse determining circuit 34, a portion of AND-INHIBIT gate 35, spike eliminator delay line 36, amplifier 37, wide pulse noise rejection circuit 38 and amplifier 41. FIGURE 4 includes generally a portion of AND-INHIBIT gate 35, 0.8 microsecond multivibrator 39, AND gate 40, amplifier 42, delay line 43 (mode A only), narrow pulse generator 44, AND gate 45 and amplifier 46. FIGURE 5 includes generally 35 microsecond multivibrator 48, amplifier 72, a portion of amplifying stages 75, narrow pulse generator 76, 0.3 microsecond delay line 77, and amplifier 78. FIGURE 6 includes generally OR circuit 52, amplifier 54, a portion of 2.5 microsecond multivibrator 55, a portion of inverting and clipping circuit 64, amplifier 65, amplifier 70, AND circuit 71, and a portion of amplifier stages 75. FIGURE 7 includes generally a portion of 2.5 microsecond multivibrator 55, transistor switch 56, pulse stretching circuit 57, amplifier 58, amplifier 63, a portion of inverting and clipping circuit 64, amplifier 79, AND circuit 80, amplifier 85, and amplifier 86. Only mode A has been illustrated in schematic form since the other modes operate in the same manner with identical circuitry.

As shown in FIGURE 3, the coded input signal (considered herein to have pulses of negative polarity) is coupled through blocking capacitor 100 to the base of common collector amplifier 28. This amplifier has its collector directly connected to a −10 volt D.-C. power source (not shown), its base connected to the junction of serially connected resistors 101 and 102, which resistors are connected between the −10 volt D.-C. power supply and a +18 volt D.-C. power supply (not shown), and its emitter connected through resistor 103 to a +10 volt D.-C. power supply (not shown).

The output is taken from the emitter of common collector amplifier 28 and coupled through coupling capacitor 104 to the base of phase splitter transistor 29. This transistor has its base connected to the junction of serially connected resistors 105 and 106, which resistors are connected between the +18 volt power supply and ground. In addition, the collector of transistor 29 is connected through resistor 107 and inductor 108 to a −18 volt D.-C. power supply (not shown), while the emitter is connected through resistors 109 and 110 to +18 volt power supply. The junction of resistors 109 and 110 also has a bypass capacitor 111 to ground.

The received coded signal is inverted in phase splitter 29 when taken from the collector output 31, but not inverted, of course, when taken from the emitter output 30. The emitter output is coupled through coupling capacitor 112 to minimum sensitivity circuit 32. This circuit includes a diode 114, the cathode of which is connected to receive the input signal from the phase splitter. Diode 114 is reverse biased, the anode being at ground potential (the anode is connected to ground through resistor 115) and the cathode having an adjustable positive potential thereon (the cathode is connected to the variable tap of potentiometer 116, which potentiometer is connected in series with resistor 117, diodes 118 and 119, and resistor 120 between the −10 volt and +10 volt power supplies). Thus, the negative pulses of the received coded signal are clipped by a predetermined amount as determined by the setting of potentiometer 116 in the minimum sensitivity circuit. This precludes ground noise from the remainder of the circuitry to help prevent undesired triggering of the transponder.

The output from minimum sensitivity circuit 32 is coupled through coupling capacitor 122 to the base of common collector amplifier 33. This amplifier has its collector directly connected to the −18 volt power supply, its base connected to the junction of resistors 123 and 124 (which resistors are connected in series between the −18 volt power supply and ground), and its emitter connected to the +18 volt power supply through resistor 125.

The output from amplifier 33 is coupled from the emitter to three pulse determining circuit 34 and, more particularly, through resistor 126 to the base of transistor 127 and through resistors 126 and 128 to one side of charging capacitor 129 (the other side of which is grounded).

Transistor 127 has its collector directly connected to the −18 volt power supply and its emitter directly connected to the collector of transistor 130. Transistor 130 has its base connected to one side of resistor 131 and capacitor 132, both of which are grounded at the other side, and to one side of thermistor 133, the other side of which is connected to the −10 volt power supply. The emitter of transistor 130 is connected to the +18 volt power supply through serially connected resistor 134, variable resistor 135 and thermistor 136.

The junction of the emitter of transistor 127 and the collector of transistor 130 is connected through resistor 137 to one side of second charging capacitor 138, the other side of which is connected to the +10 volt power supply through resistor 139, with ground through diode 140, and to the base of transistor 141 (see FIGURE 4) through lead 142. The collector of transistor 141 is connected to the −10 volt power supply through resistor 143, while the emitter connected to the +10 volt power supply through resistor 144. In addition, the emitter also has a bypass capacitor 145 to ground. The collector of transistor 141 is connected through coupling capacitor 146 and resistor 147 to the base of transistor 148, which transistor is one of the four transistors of AND-INHIBIT gate 35. Both the collector of transistor 141 and the base of transistor 148 have capacitors 149 and 150, respectively, to ground, and the base of transistor 148 is also connected to the −10 volt power supply through resistor 151 and with ground through diode 152.

The negative polarity pulse train of the received coded signal is thus coupled to three pulse determining circuit 34 through amplifier 33 (if above minimum sensitivity so as to pass through minimum sensitivity circuit 32). When this occurs, capacitor 129 is charged through transistor 33 and resistors 126 and 128. The charge time is less than the minimum pulse width so that charging capacitor 129 is charged to the full amplitude of the received pulse. At the termination of this pulse, transistor 33 is reversed biased by the charge on capacitor 129 so that charging capacitor 129 discharges exponentially through resistor 125 (which resistor is chosen to have a value much greater than that of resistors 126 and 128).

While charging capacitor 129 was being charged, charging capacitor 138 was also being charged through transistor 127, resistor 137 and transistor 141. Here again, the components are selected so that capacitor 138 charges to the full amplitude of the received pulse. At the termination of this pulse, charging capacitor 138 is discharged linearly (rather than exponentially) through the constant current generator consisting of thermistor 136, variable resistor 135, resistor 134, transistor 130, resistor 137, and diode 140. The purpose of providing an exponential discharge of charging capacitor 129 is to minimize the base-emitter leakage current of transistor 127 by reducing the otherwise large base-emitter reverse bias thereon, while the linear discharge of charging capacitor 138 allows a discharge time that is directly proportional to pulse amplitude. The discharge time of charging capacitor 129 is less than that of charging capacitor 138 to insure that the discharge rate of charging capacitor 138 will be linear.

The inverted pulses (positive polarity) from phase splitter 29 (FIGURE 3) are taken from output 31 and coupled through resistor 155 and capacitor 156, connected in parallel, and coupling capacitor 157 to the base of transistor 158. This transistor is the second of the four transistors of AND-INHIBIT gate 35. Transistor 158 has its base connected to the −10 volt power supply through resistor 159 and connected with ground through diode 160, its emitter grounded, and its collector connected to the collector of transistor 148 (and to the collector of the other two AND-INHIBIT transistors in like manner) through lead 161.

The inverted output signal from phase splitter 29 is also coupled to spike eliminator delay line 36. This delay line has two outputs, one of which is delayed 0.5 microsecond and the other of which is delayed 0.4 microsecond. The 0.4 microsecond delay is taken from the delay line at 162 and coupled to the emitter of common base amplifier 37 through coupling capacitor 163 and resistor 164. Transistor 37 has its base grounded, its emitter connected to the +10 volt power supply through resistor 165, and its collector connected to the −10 volt power supply through inductor 166.

The output from transistor 37 is taken from the collector and coupled to wide pulse noise rejection circuit 38 through coupling capacitor 167. Circuit 38 includes parallel signal paths one of which includes resistor 169 and the other of which includes diode 168 and resistor 170, the latter of which is connected in parallel with capacitor 171. In addition, a diode 172 is connected between ground and the junction of resistors 169 and 170 and capacitor 171. The input pulse on circuit 38 is differentiated by inductor 166 and the leading edge coupled from circuit 38 through both parallel signal paths of the circuit, while diode 168 blocks the trailing edge of the differentiator pulse so that it is coupled only through the path that includes resistor 169. This precludes ringing and thus serves the function of wide pulse rejection.

The output from wide pulse noise rejector circuit 38 is taken from the common junction of resistors 169 and 170 and capacitor 171 and coupled to transistor 174, which transistor is the third transistor of the AND-INHIBIT gate circuit 35. This transistor has its emitter grounded, its base connected to the −10 volt power supply through resistor 175, and its collector connected to the −10 volt power supply through resistor 176 and inductor 177.

The 0.5 microsecond delayed output from spike eliminator delay line 36 is coupled from the delay line at 179 through coupling capacitor 180 and resistor 181 to the emitter of common base amplifier 41. Transistor amplifier 41 has its base grounded, its emitter connected to the +10 volt power supply through resistor 182, and its collector connected to the −18 volt power supply through resistor 183. The output from amplifier 41 is coupled from the collector through resistor 184, coupling capacitor 185, and lead 186 to diode AND circuit 40.

Each time that the three AND-INHIBIT gate transistors (148, 158 and 174) receive a pulse in coincidence, an output pulse will be produced by AND-INHIBIT gate 35 unless the fourth transistor 188 (FIGURE 4) is conductive to preclude an output as explained more fully hereinafter. The pulse train produced at the output of AND-INHIBIT gate 35 is coupled through coupling capacitor 189 (FIGURE 4) to 0.8 microsecond monostable multivibrator 39.

Multivibrator 39 includes a pair of transistors 190 and 191, the former of which is normally in a nonconductive state and the latter of which is normally in a conductive state. The emitters of these transistors are directly connected to the +10 volt power supply and the emitter of transistor 190 also has a capacitor 192 to ground. The bases of these transistors are connected to the +18 volt power supply through resistors 193 and 194, respectively, and with the +10 volt power supply through diodes 195 and 196, respectively. In addition, the base of transistor 190 is connected to the collector of transistor 191 through resistor 197 and to the anode of diode 198. The cathode of diode 198 is connected to the +18 volt power supply through resistor 199 and to the anode of diode 200 (the cathode of which is connected to the +10 volt power supply).

The collector of transistor 191 is connected to the −10 volt power supply through resistor 201 and inductor 202, and to one side of capacitor 203, which capacitor is connected at its other side to the anode of diode 204 and through resistor 205 to the +10 volt power supply. The collector of transistor 190 is connected to the anode of diode 206 (the cathode of which is connected to capacitor 189) and to one side of capacitors 207 and 208, each of which capacitors are connected at the other side to the opposite poles of diodes 209. In addition, the junction of capacitor 208 and the cathode of diode 209 is connected to the −18 volt power supply through resistor 210 and variable resistor 211.

One output from 0.8 microsecond multivibrator 39 is coupled from the collector of transistor 190 directly to AND circuit 40. AND circuit 40 includes a pair of diodes 214 and 215. The cathode of diode 214 is connected to the collector of transistor 190, while the anode of diode 215 is grounded, and the common junction of the anode of diode 214 and the cathode of diode 215 is connected with ground through resistor 216 and with amplifier 41 through lead 186, capacitor 185 and resistor 184.

The output from AND circuit 40 is coupled to the base of transistor 218 of amplifier and signal inverting stages 42 (FIGURE 4). Transistor 218 has its emitter connected to the −10 volt power supply through resistor 219 and its collector directly connected to the +10 volt power supply. The output from transistor 218 is taken from the emitter through coupling capacitor 220 to the base of transistor amplifier 221. The base of transistor 221 is also connected to the junction of resistors 222 and 223, which resistors are connected in series between the +18 volt power supply and ground. The collector of transistor 221 is connected to the +18 volt power supply through resistor 224, while the emitter is connected to the −18 volt power supply through variable resistor 225 and resistor 226, the junction of which resistors has a bypass capacitor 227 to ground.

The output from the collector of transistor 221 is coupled through coupling capacitor 228 to the base of transistor amplifier 229. This transistor has its collector connected to the −18 volt power supply, its base connected to the junction of resistors 230 and 231 (which resistors are connected in series between the −18 volt power supply and ground), and its emitter connected to ground through resistor 232. The output from the emitter of transistor 229 is then coupled through coupling capacitor 233 to delay line 43 (mode A only shown in FIGURE 4), the other end of which delay line is grounded through resistor 234.

Delay line 43 is tapped at 1.7 microseconds and the delayed pulse output coupled to the base of common collector amplifier 46. This amplifier has its collector connected to the −18 volt power supply and its emitter connected to the +10 volt power supply through resistor 235. The emitter follower output is then coupled through coupling capacitor 236 to AND circuit 45.

The output from 0.8 microsecond multivibrator 39 is also coupled from the collector of transistor 190 through resistor 237 to a clipping circuit that includes a clipping diode 238, an inductor 239 connected between the anode of diode 238 and to the −10 volt power supply, and a resistor 240 connected between the cathode of diode 238 and the −10 volt power supply. The output from this clipping circuit is then coupled through differentiating capacitor 241 to the base of transistor 242 of narrow pulse generator 44. Transistor 242 has its base connected to the −10 volt power supply through resistor 243 and to the anode of diode 244 (the other side of which is connected to ground), its emitter connected directly to ground, and its collector connected to the −10 volt power supply through resistor 245. The output from narrow pulse generator 44 is taken from the collector of transistor 242 and coupled through coupling capacitor 246 to AND circuit 45.

AND circuit 45 includes diodes 249, 250, and 251 with the cathodes of diodes 249 and 250 being directly connected to the anode of diode 251. In addition, the anode of diode 249 is connected to capacitor 236 and resistor 252 (leading to the +10 volt power supply), the anode of diode 250 is connected to capacitor 246 and resistor 253 (leading to the +10 volt power supply), and the cathode of diode 251 is grounded.

The output from AND circuit 45 is taken from the common junction of diodes 249, 250, and 251 and coupled to the base of transistor amplifier 47, which base is also connected to the −10 volt power supply through resistor 254. In addition, the emitter of transistor 47 is grounded while the collector is connected to −10 volt power supply through resistor 255. The output from transistor amplifier 47 is taken from the collector and coupled through coupling capacitor 256 (the side opposite to said collector is connected to the junction of resistors 257 and 258 connected in series between the +10 volt power supply and ground), lead 259 and diode 260 to 35 microsecond monostable multivibrator 48 (see FIGURE 5 for schematic).

Thirty-five microsecond multivibrator 48 includes transistors 263 and 264 (the former of which is normally in a conductive state while the latter is normally in a nonconductive state), both of which have their emitters directly connected to the +10 volt power supply, and their collectors connected to the −10 volt power supply through resistor 265 and serially connected resistor 266 and inductor 267 (by means of lead 268), respectively. The base of transistor 264 is connected to the anode of diode 269 (the cathode of which is connected to the collector of transistor 263) and to the +18 volt power supply through resistor 270, while the base of transistor 263 is connected to the anode of diode 271 (the cathode of which is connected to the +10 volt power supply), to one side of resistor 272 (the other side of which is connected to the +18 volt power supply), to the cathode of diode 260 (through which the input signal to the multivibrator is coupled), and to the anode of diode 273. The cathode of diode 273 is connected to the −18 volt power supply through resistor 274 and to one side of capacitor 275, the other side of which is connected to the collector of transistor 264.

The output from 35 microsecond blanking multivibrator 48 is coupled from the collector of transistor 264 through lead 268 (lead 268 is also connected to the cathode of diode 276, the anode of which is grounded), diode 277 and resistor 278 to the base of signal inverting transistor 49. As shown in FIGURE 4, resistor 278 has a capacitor 279 in parallel therewith, a resistor 280 to ground connected to the junction of resistor 278, capacitor 279 and diode 277, and a diode 281 to ground connected to the junction of the base of transistor 49, resistor 278 and capacitor 279. The base of transistor 49 is connected to the −10 volt power supply through resistor 282, while the emitter is grounded and the collector is connected to the −10 volt power supply through resistor 283.

The output from signal inverting transistor 49 is taken from the collector and coupled through coupling capacitor 285 to the base of transistor 188, which transistor is the fourth transistor of AND-INHIBIT gate circuit 35 and performs the inhibit, or blocking, function of the gate. Transistor 188 has its emitter directly connected to ground, its base connected to the cathode of diode 287 (the anode of which is grounded) and to the +10 volt power supply through resistor 288, and its collector collected in common to the collectors of normally conductive transistors 148, 158, and 174. Transistor 188 is normally nonconductive, and is changed to the conductive state only after receiving the blanking pulse from multivibrator 48. When this occurs, an output is precluded from AND-INHIBIT gate 35 until multivibrator 48 ceases to operate (at the end of 35 microseconds after operation commences).

The two pulse output from the first pulse analyzing circuit (consisting of two pulses spaced either two microseconds or eight microseconds when mode A is utilized) is tapped from the delay line at 6.4 microseconds and coupled through lead 290, diode 291 (OR circuit 52 diode), and lead 53 to the base of transistor 293 of amplifying and signal inverting stages 54 (see FIGURE 6 for schematic). This transistor has its base connected to ground through resistor 294, its collector directly connected to the −18 volt power supply, and its emitter connected to the +18 volt power supply through resistor 295.

Transistor 293 is an emitter follower, the output being taken from the emitter through serially connected coupling capacitor 296 and resistor 297 to the emitter of transistor amplifier 298. Transistor amplifier 298 has its emitter connected to the +18 volt power supply through resistor 299, its base grounded, and its collector connected to the −18 volt power supply through resistor 300. The output is taken from the collector of transistor 298 through coupling capacitor 301 to the base of transistor amplifier 302. This transistor has its base connected to the junction of resistors 303 and 304, which resistors are connected between the −18 volt power supply and +18 volt power supply. The emitter of transistor 302 is grounded and the collector is connected to the −18 volt power supply through resistor 305. The output is taken from the collector of transistor 302 and coupled through coupling capacitor 306 to the cathode of reference diode 307 (the anode of diode 307 is grounded), to one side of resistor 308 (the other side of which is grounded), and through diode 309 to 2.5 microsecond monostable multivibrator 55.

As is conventional, multivibrator 55 includes a pair of transistors 311 and 312 (the former of which is normally in a conductive state and the latter of which is normally in a nonconductive state), both of which have their emitters grounded and their collectors connected to the −10 volt power supply through resistors 313 and 314, respectively (the power supply connected end of resistor 314 has a bypass capacitor 315 to ground). The base of transistor 311 is connected to the cathode of diode 309 (through which the input signal is coupled), to the anode of diode 316 (the cathode of which is grounded), to one side of resistor 317 (the other side of which is connected to the +18 volt power supply), and to the anode of diode 318 (the cathode of which is connected through resistor 319 to the −18 volt power supply and through lead 320 and capacitor 321 to the collector of transistor 312). The base of transistor 312 is connected to the anode of diode 322 (the cathode of which is grounded), to one side of resistor 323 through lead 324 (the other side of resistor 323 is connected to the +18 volt power supply), and to the anode of diode 325 and one side of capacitor 326 (the cathode of diode 325 and the other side of capacitor 326 are connected to the collector of transistor 311).

The output from 2.5 microsecond multivibrator 55 is coupled through coupling capacitor 329 to the base of transistor switch 56. This transistor has its base connected to ground through resistor 330, its emitter connected to the +10 volt power supply through resistor 331, and its collector connected to the anode of diode 332 (the cathode of which is connected to ground).

The output from transistor switch 56 is coupled from the collector to pulse stretching circuit 57, and more particularly to the anode of diode 333 therein. The anode of diode 333 is also connected to one end of capacitor 334 (the other end of which capacitor is connected to ground), while the cathode of diode 333 is connected through resistor 335 to ground and to one side of capacitor 336 (through which capacitor a second input is coupled to the pulse stretching circuit).

For mode A operation, an output is also coupled from the delay line delayed 7.2 microseconds through lead 59 to the base of common collector transistor amplifier 338 of amplifier stages 58 (see FIGURE 7 for schematic). Transistor amplifier 338 has its collector directly connected to the −18 volt power supply and its emitter connected to the +10 volt power supply through resistor 339. The output is taken from the emitter and coupled through coupling capacitor 340 and level adjustment variable resistor 341 to the emitter of transistor amplifier 342. Transistor amplifier 342 has its base grounded, its emitter connected to the −18 volt power supply through resistor 343, and its collector connected to +18 volt power supply through resistor 344. The output is taken from the collector of the amplifier 342 through coupling capacitor 345 to the base of transistor amplifier 347. Transistor amplifier 347 has its base connected to ground through resistor 348, its collector connected directly to the −18 volt power supply, and its emitter connected to the +18 volt power supply through resistor 349. Transistor 347, also being an emitter follower, has its output taken from the emitter and coupled directly to the base of transistor amplifier 351. Transistor 351 has its collector connected directly to the −18 volt power supply and its emitter connected to the +18 volt power supply through resistor 352. The output is likewise taken from the emitter of transistor 351 and coupled through coupling capacitor 336 to pulse stretching circuit 57 to supply the second input to this circuit.

The output from pulse stretching circuit 57 is taken from the anode of diode 333 and coupled directly to the base of transistor amplifier 63. This transistor has its collector connected directly to the −18 volt power supply and its emitter connected to the +18 volt power supply through resistor 355. The output is taken from the emitter of transistor 63 and connected to the cathode of diode 356 of inverting and clipping circuit 64. The anode of diode 356 is connected to one side of capacitor 357, the other side of which is connected through lead 358 to the base of transistor amplifier 359 (see FIGURE 6). The junction of diode 356 and capacitor 357 is connected to the tap of potentiometer 360, which potentiometer is connected in series with resistors 361 and 362 between the +10 volt and −10 volt power supplies to form a level control circuit. This circuit acts to reduce the amplitude of the coded signal by a predetermined amount (for example, four decibels with respect to transponder input magnitude).

Transistor amplifier 359 has its base connected to the junction of resistors 363 and 364, which resistors are serially connected between the −18 volt and +18 volt power supplies. In addition, the emitter of transistor 359 is connected to the +18 volt power supply through serially connected resistor 365 and variable resistor 366, with variable gain control resistor 366 having a capacitor 367 in parallel therewith and the junction of resistors 365 and 366 having a bypass capacitor 368 to ground.

The collector of transistor 359 is connected to the −18 volt power supply through resistor 369 and the output is taken from the collector and coupled through coupling capacitor 370 to the base of transistor amplifier 65. Transistor amplifier 65 has its collector directly connected to the +18 volt power supply, its emitter connected to the −10 volt power supply through resistor 371, and its base connected with ground through resistor 372. Transistor 65 is an emitter follower and the output is taken from the emitter through coupling capacitor 373 and coupled to resistor 375, which resistor, along with resistor 376, comprises comparison means, or adder, 66.

The second input to comparison means 66 is coupled to resistor 376 from the emitter of transistor 229 of amplifier and signal inverting stages 42 (see FIGURE 4 for schematic) through lead 67, capacitor 377, diodes 378 and 379, and capacitor 380. In addition, the junction of diode 379 and capacitor 380 is connected at one side to resistor 381 (the other side of which is connected to ground), while the junction of capacitor 377 and diode 378 is likewise connected to one side of resistor 382 (the other side of which is connected to ground). Thus, at the adder, the first and last pulses of the received coded signal are compared which, of course, would be the pulses separated 8 microseconds for mode A operation regardless of whether the two pulse or the three pulse system is utilized.

The difference output from comparison means 66 is taken from the junction of serially connected resistors 375 and 376 and coupled to the base of transistor amplifier 384 of amplifying and signal inverting stages 70. Transistor 384 has its base connected to the junction of resistors 385 and 386 (which resistors are connected in series between the −18 volt and +18 volt power supplies), its collector connected to the −18 volt power supply through resistor 387, and its emitter connected to ground through serially connected resistors 388 and 389, the latter of which has a bypass capacitor 390 in parallel therewith.

The output from transistor 384 is coupled from the collector through coupling capacitor 391 to the base of transistor amplifier 392. This transistor has its base connected to the junction of resistors 393 and 394 (which resistors are connected in series between the −18 volt and +18 volt power supplies), its collector directly connected to +18 volt power supply, and its emitter connected to ground through resistor 395. Transistor 392 is an emitter follower and the output is coupled from the emitter through coupling capacitor 396 of diode 398 of AND circuit 71.

AND circuit 71 includes diodes 398, 399, and 400 with the anodes of diodes 398 and 399 and the cathode of diode 400 being connected at a common junction. The +18 volt power supply is connected to this junction through a resistor 401, while the cathodes of diodes 398 and 399 are connected to the −18 volt power supply through resistors 402 and 403, respectively, and the anode of diode 400 is grounded.

At amplifying stages 58, the output is coupled both to pulse stretching circuit 57 (as brought out hereinabove) and to amplifying stages 75. This is shown in the schematic drawings in FIGURE 7 where the emitter of transistor 351 is shown connected to pulse stretching circuit 57. The second output from amplifying stages 58 is coupled from the emitter of transistor 351 through capacitor 405, lead 406, and parallel connected capacitor 407 and resistor 408 to the emitter of transistor 409 of amplifying stages 75 (shown in schematic form in FIGURES 5 and 6). Transistor 409 has its base grounded, its collector connected to the −18 volt power supply through resistor 410, and its emitter connected to the +18 volt power supply through resistor 411.

The output from transistor 409 is taken from the collector through coupling capacitor 412 to the base of transistor 413. This transistor has its emitter grounded, its base connected to the junction of resistors 414 and 415 (which resistors are connected in series between the −18 volt and the +18 volt power supplies), and its collector connected to the −18 volt power supply through resistor 416. The output from transistor 413 is coupled from the collector through lead 417 and coupling capacitor 418 to the base of transistor 419. This transistor has its emitter grounded, its base connected to the −10 volt power supply through resistor 420, and its output taken from the collector through diode 421 (the cathode of which is connected to the −10 volt power supply through resistor 422) and diode 423 to the base of transistor 424 in narrow pulse generator 76.

Transistor 424 has its emitter connected to ground through resistor 425 (which resistor has a capacitor 426 in parallel therewith) and its collector connected to the −18 volt power supply through resistor 427. In addition, the base of transistor amplifier 424 is connected through serially connected inductor 428 and resistor 429 to the +10 volt power supply, and through serially connected resistor 430 and variable resistor 431 to the −10 volt power supply, the junction beween said resistors being connected to the junction between inductor 428 and resistor 429 and having a bypass capacitor 432 to ground.

The output from narrow pulse generator 76 (approximately 0.8 microsecond wide) is coupled from the collector of transistor 424 through coupling capacitor 434 to 0.3 microsecond delay line 77. The output from 0.3 microsecond delay line 77 is then coupled to the base of transistor amplifier 78. This transistor amplifier has its base connected to ground through resistor 435, its emitter connected to the −18 volt power supply through resistor 436, and its collector directly connected to the +18 volt power supply. The output from transistor 78 is coupled from the emitter through coupling capacitor 437 to the cathode of diode 439 of AND circuit 73.

AND circuit 73 includes three diodes 439, 440, and 441 with the anodes of diodes 439 and 440 being connected at a common junction with the cathode of diode 441, which junction is connected to the +18 volt power supply through resistor 442. The cathodes of diodes 439 and 440 are connected to the −18 volt power supply through resistors 443 and 444, respectively, while the anode of diode 441 is grounded.

The second input to diode AND circuit 73 is coupled from 0.8 microsecond multivibrator 39. As shown in FIGURE 4, this output is coupled from the collector of transistor 190 through lead 74 and coupling capacitor 445 to the cathode of diode 440.

The output from AND circuit 73 is coupled from the common junction of diodes 439, 440, and 441 to the base of transistor amplifier 72. This transistor has its collector directly connected to the +10 volt power supply, its base connected to the +18 volt power supply through resistor 442, and its emitter connected to ground through resistor 446 (which resistor has capacitors 447 and 448 each connected in parallel therewith). Transistor 72 is an emitter follower and the output is coupled from the emitter through lead 449 and coupling capacitor 450 to the cathode of diode 399 of AND circuit 71 (see FIGURE 6 of schematic drawing).

The output from diode AND circuit 71 is coupled from the common junction of diodes 398, 399, and 400 through coupling capacitor 452 and lead 453 to the base of transistor amplifier 79 (see FIGURE 7 of schematic drawing). This transistor amplifier has its collector directly connected to the +10 volt power supply, its base connected to ground through resistor 454, and its emitter connected to the −18 volt power supply through resistor 455. Transistor 79 is an emitter follower and the output is coupled from the emitter through coupling capacitor 456 to the cathode of diode 458 of diode AND circuit 80 (mode A operation).

Diode AND circuit 80 includes three diodes 458, 459, and 460 with the anodes of diodes 458 and 459 being connected in common with the cathode of diode 460, the common junction being connected to the +18 volt power supply through resistor 461. The cathodes of diodes 458 and 459 are connected to the −18 volt power supply through resistors 462 and 463, respectively, while the anode of diode 460 is grounded.

For mode A operation, delay line 43 (see FIGURE 4) is also tapped at 7.8 microseconds delay. The delayed output is coupled through lead 84 to the base of transistor amplifier 85. This transistor amplifier has its collector directly connected to the −18 volt power supply and its emitter connected to the +10 volt power supply through resistor 465. The output from transistor 85 is coupled from the emitter through serially connected coupling capacitor 466 and resistor 467 to the base of transistor amplifier 86. Transistor amplifier 86 has its base connected to the junction of resistors 469 and 470 (which resistors are connected in series between the +10 volt power supply and ground), its emitter grounded, and its collector connected to the −10 volt power supply through resistor 471. The output is taken from the collector of transistor 86 and coupled through coupling capacitor 472 to the cathode of diode 459 of AND circuit 80. The output from the suppression network for mode A operation is then coupled from the common junction of diodes 458, 459, and 460 and coupled from the network by means of lead 473.

In operation, the suppression network of this invention is capable of receiving either a two pulse or a three pulse coded interrogation signal and automatically determining from the spacing and relative magnitudes of the pulses whether a reply should be transmitted, and if so, in what mode.

Figure 8:
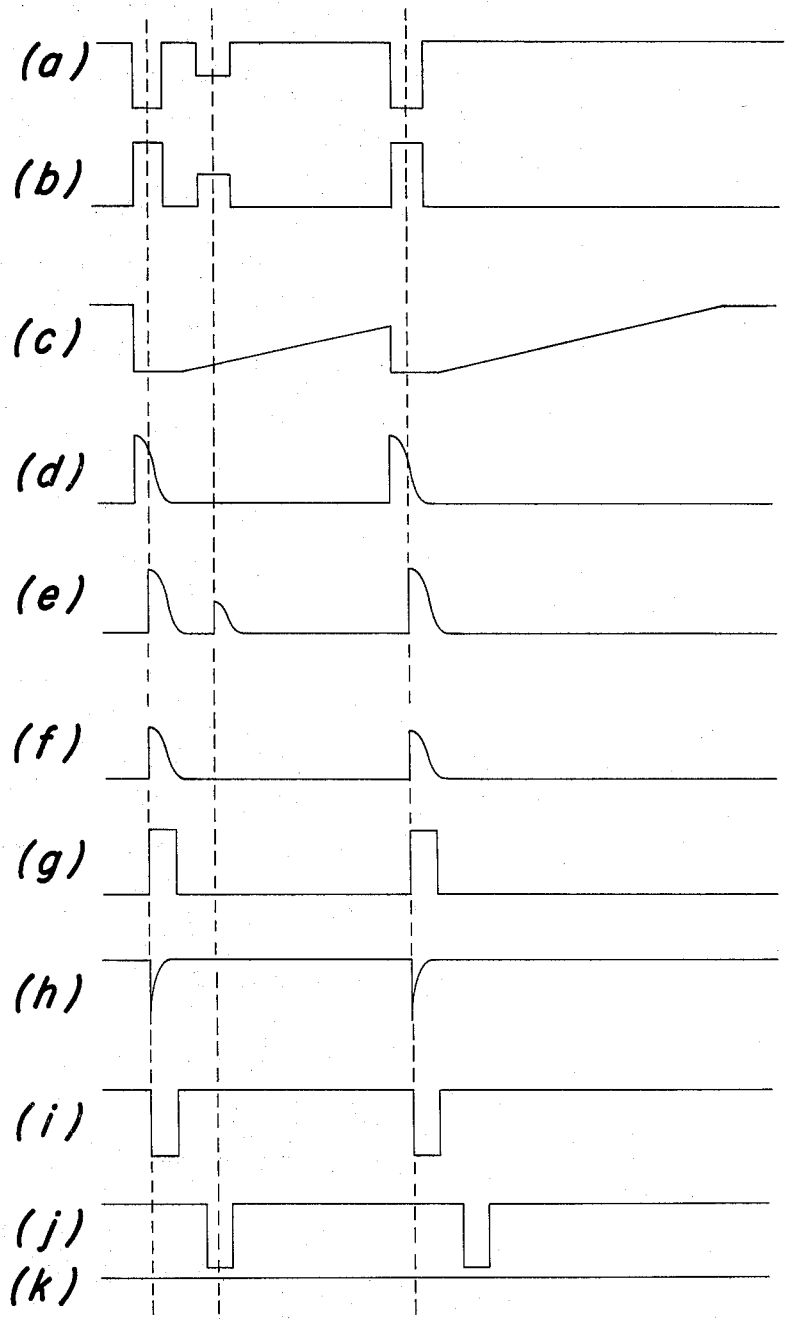

Considering first that a three pulse coded signal is received from the interrogation radar system, the received pulse train would appear typically as shown in (a) of FIGURE 8 for mode A operation if the trigger pulses originated from the main lobe of the directionally radiating antenna. As shown, the first and last pulses are trigger pulses originating from the directionally radiating antenna and timewise spaced eight microseconds, while the middle pulse is the control pulse from the nondirectional antenna and timewise spaced two microseconds from the first trigger pulse (the spacing referred to throughout being considered from the leading edge of each pulse).

Figure 10:
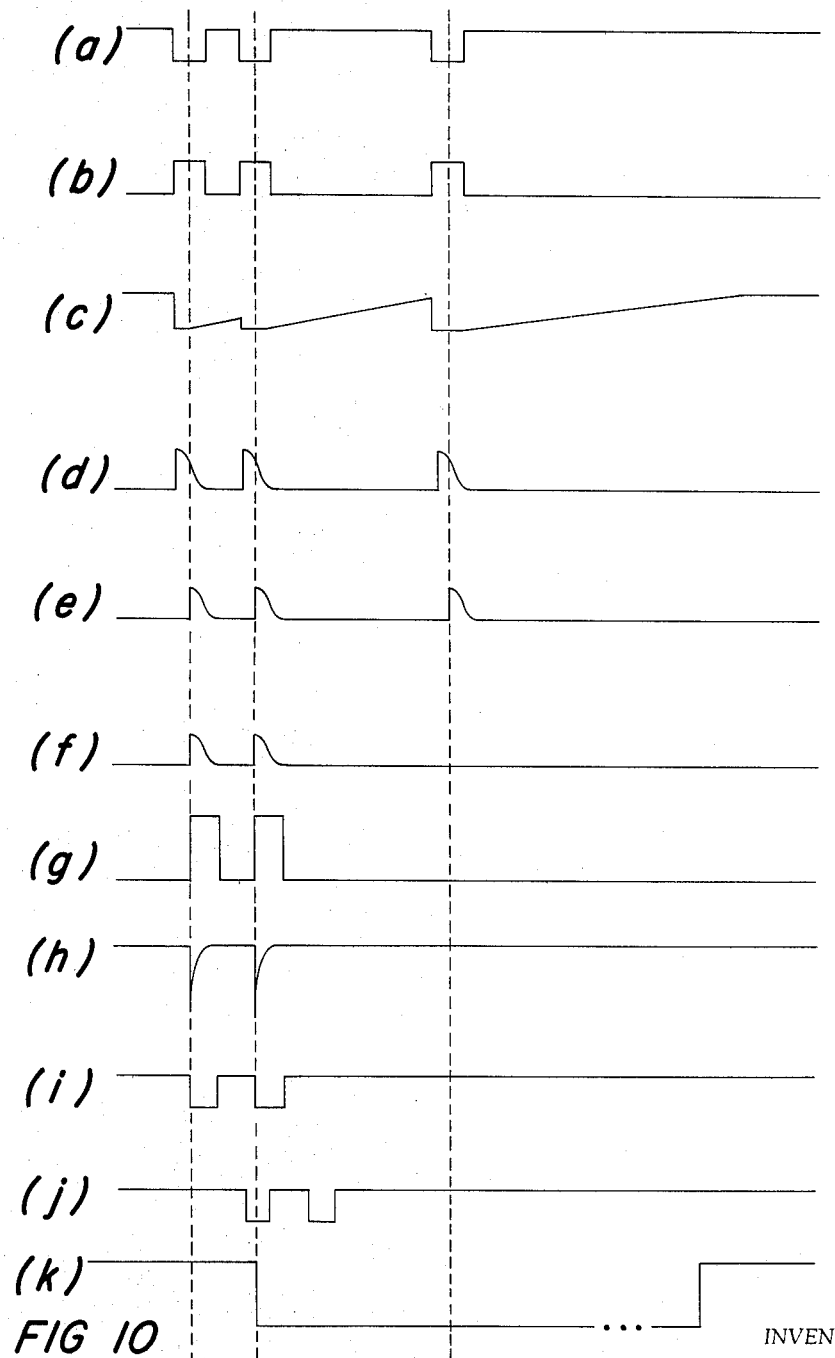

If, however the trigger pulses originated from a side lobe of the directionally radiating antenna, then the received three pulse coded signal would have trigger pulses of reduced magnitude, as shown typically in (a) of FIGURE 10.

The received coded signal is applied to the first pulse analyzing means by being coupled through phase splitter 29 both with and without a change in signal polarity so that one output (30) includes pulses of negative polarity (assuring a negative polarity input wave train) as shown in (a) of FIGURES 8 and 10, while the other output (31) includes pulses of positive polarity as shown in (b) of FIGURES 8 and 10.

The negative polarity coded signal is coupled through minimum sensitivity circuit 32 and amplifier 33 to three pulse determining circuit 34 where the first trigger pulse charges the charging capacitors therein to full amplitude. One charging capacitor is then discharged linearly [see (c) of FIGURES 8 and 10] to afford a comparison of the amplitudes of the first trigger pulse and the control pulse. If, as shown in (c) of FIGURE 8, the first trigger pulse originated from the main lobe of the directionally radiating antenna, then the control pulse which appears two microseconds after the trigger pulse will not have a magnitude greater than that remaining on the linearly discharging capacitor and hence the capacitor will not be recharged due to the control pulse.

If, however the pulse originated from a side lobe of the directionally radiating antenna, then the control pulse will have a larger magnitude than that remaining on the linearly discharging capacitor and hence the control pulse will recharge the charging capacitor to full amplitude as shown in (c) of FIGURE 10.

At the output of three pulse determining circuit 34, the first trigger pulse will always appear and the control pulse will appear only if larger than the decaying first trigger pulse remaining on the charging capacitor (as would be the case if from a side lobe of the directionally radiating antenna). The second trigger pulse will, of course, also appear, so the output pulse train from pulse determining circuit 34 will consist of only the two trigger pulses if the trigger pulses originated from the main lobe of the directionally radiating antenna [as shown in (d) of FIGURE 8] or of all three pulses if the trigger pulses originated from a side lobe [as shown by (d) of FIGURE 10].

The pulse train, which at the output of pulse determining circuit 34 is now of positive polarity, is coupled to AND-INHIBIT gate circuit 35.

A second input to AND-INHIBIT gate 35 is coupled directly thereto from phase splitter 29. Since this output is connected to the inverted pulse output terminal of the phase splitter, the pulse train directly coupled to AND-INHIBIT gate 35 will also be of positive polarity as shown in (b) of FIGURES 8 and 10.

The third input to AND-INHIBIT gate 35 for the AND function is coupled thereto from spike eliminator delay line 36 (delay 0.4 microsecond) through wide pulse noise rejection circuit 38. Delay line 36 receives pulses of positive polarity, and the delayed pulse train coupled to AND-INHIBIT gate 35 is also of positive polarity as shown by (e) of FIGURES 8 and 10.

Whenever positive pulses are received coincidently from all three AND function inputs, AND-INHIBIT gate 35 produces an output pulse unless precluded by an INHIBIT input to the gate. When an INHIBIT input occurs, the last pulse (second trigger pulse) is blocked. As shown by (f) of FIGURES 8 and 10, the output from AND-INHIBIT gate 35 will therefore consist of either the first and last pulse (if the trigger pulses originated from the main lobe—FIGURE 8) or only the first trigger pulse and the control pulse (if the trigger pulse originated from a side lobe—FIGURE 10).

The output pulses from AND-INHIBIT gate 35 are then coupled to 0.8 microsecond multivibrator 39 where output pulses of exactly 0.8 microsecond width are produced in response to each pulse received as shown in (g) of FIGURES 8 and 10. The magnitude of the pulses from multivibrator 39 will, of course, be the same regardless of the input pulse magnitude.

The pulses from 0.8 microsecond multivibrator 39 are coupled to narrow pulse generator 44, which generator produces a sharp negative spike for each pulse received as shown in (h) of FIGURES 8 and 10. These spike pulses are then coupled to AND circuit 45 as one input thereto.

The output pulses from 0.8 microsecond multivibrator 39 are also coupled to AND gate 40, which gate receives a second input from delay line 36 (delayed 0.5 microsecond) through amplifier 41 [waveform substantially as shown in (b) of FIGURES 8 and 10 but delayed 0.5 microsecond]. Since the pulse train from 0.8 microsecond multivibrator 39 consists of no more than two pulses, the output from AND gate 40 can likewise consist of only two pulses, the width of which are 0.8 microsecond and the magnitude of which is controlled by the magnitude of the pulses from spike eliminator delay line 36. These pulses are then inverted by amplifier and signal inverter stages 42 and pulses of negative polarity, as shown by (i) of FIGURES 8 and 10, are then coupled to delay line 43.

A pulse train delayed 1.7 microseconds is coupled from delay line 43 and coupled through amplifier 46 to AND gate 45 [as shown by (j) of FIGURES 8 and 10], where the two inputs of negative polarity are compared. If the first trigger pulse (delayed) is coincident with the control pulse, that is, if a negative spike coincides with the negative pulses from the delay line (as will be the case only if the control pulse was not eliminated in pulse determining circuit 34) [as shown by (i) and (j) of FIGURE 10], then an output pulse will be produced by AND gate 45.

If, however, only the two trigger pulses appear [as shown by (*i*) and (*j*) of FIGURE 8], then AND gate 45 will not produce an output pulse.

If an output pulse is produced at the output of AND gate 45, this pulse is coupled to 35 microsecond multivibrator 48. This multivibrator, when triggered, produces a 35 microsecond blanking voltage that is inverted to negative polarity by signal inverter 49 [as shown by (*k*) of FIGURE 10], and coupled to AND-INHIBIT gate 35 to preclude an output therefrom for 35 microseconds to thus eliminate the second trigger pulse. If, however, no output pulse is produced by AND gate 45, then multivibrator 48 will not be triggered [as shown by (*k*) of FIGURE 8], and AND-INHIBIT gate 35 will not be blocked so that the second trigger pulse will appear. It should thus be evident that the first pulse analyzing circuit will always produce an output pulse train consisting of two pulses timewise spaced either two microseconds or eight microseconds (for mode A operation).

The pulse train received by delay line 43 is then coupled from the delay line with a 6.4 microsecond delay [as shown by (*l*) of FIGURES 9 and 11] and subsequently coupled to 2.5 microsecond multivibrator 55. This multivibrator produces output pulses of approximately 2.5 microseconds width [as shown by (*m*) of FIGURES 9 and 11], and this means that if the control pulse is present, only one 2.5 microsecond pulse will appear since the control pulse occurs while the first 2.5 microsecond pulse is being produced [as shown by (*m*) of FIGURE 11]. These wide pulses (or pulse) are then coupled to pulse stretching circuit 57.

Figure 9:
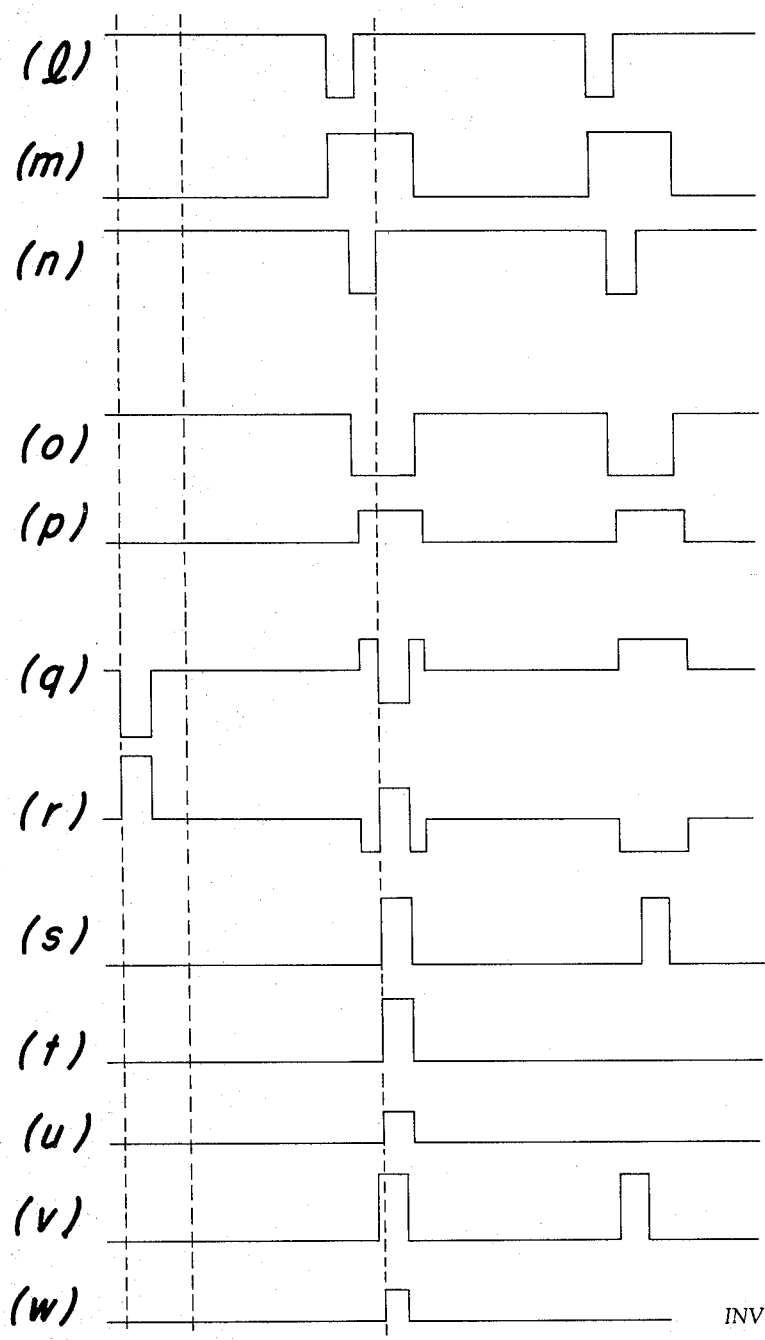
Figure 11:
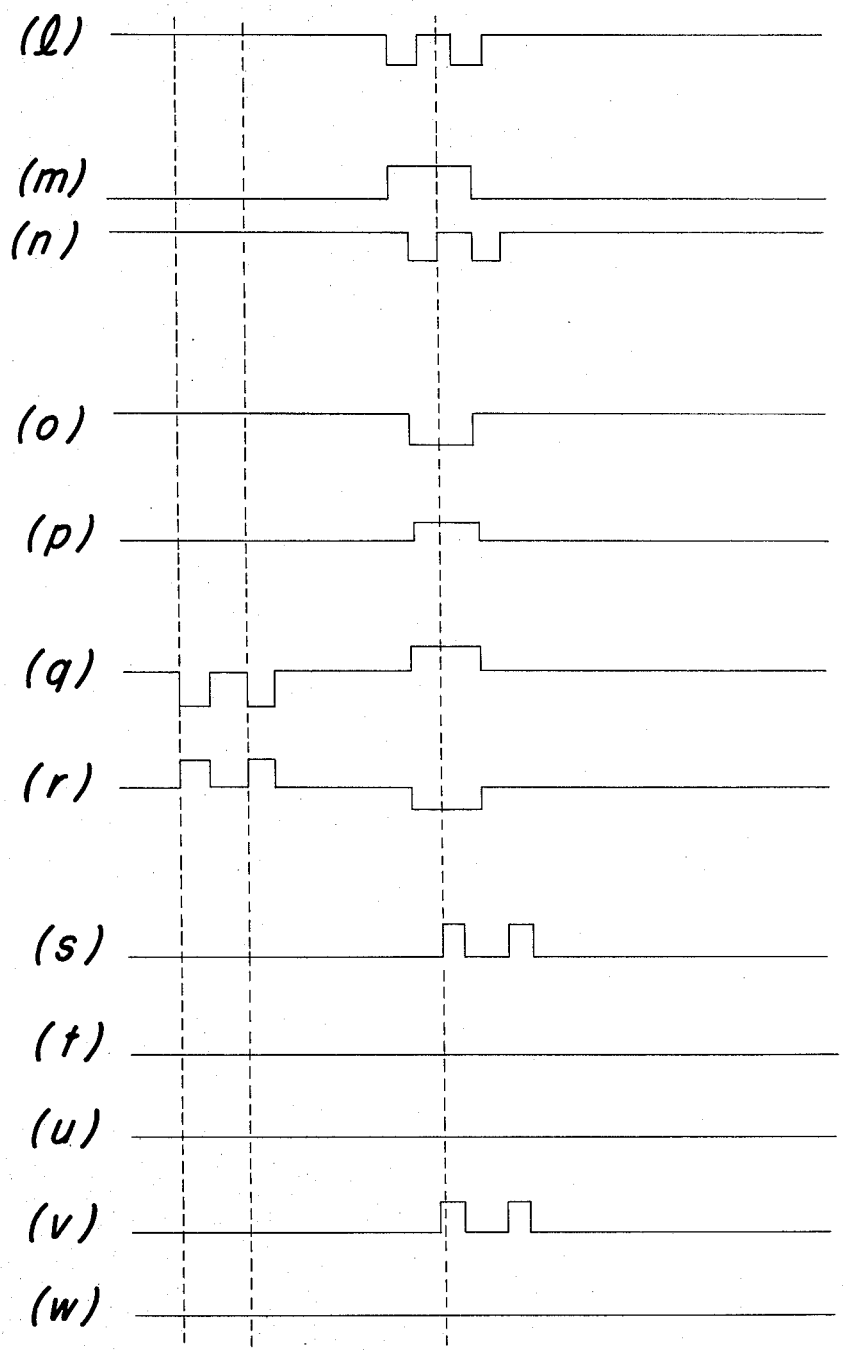

The pulse train received at delay 43 is also coupled therefrom with a delay of 7.2 microseconds as shown by (*n*) of FIGURES 9 and 11. These pulses are coupled to pulse stretching circuit 57 as a second input thereto. Pulse stretching circuit 57 then produces an output as shown by (*o*) of FIGURES 9 and 11, which output is inverted in polarity, reduced in magnitude, and delayed approximately 0.2 microsecond at inverting and clipping circuit 64 so that a pulse train of positive polarity and reduced magnitude [as shown by (*p*) of FIGURES 9 and 11] is applied to the second analyzing means by being coupled to comparison means 66.

The second input to comparison means 66 is the same pulse train as is coupled to delay line 43 [see (*i*) of FIGURES 8 and 10]. The magnitudes of the two opposing polarity pulse trains are compared and a difference output is produced as shown in (*q*) of FIGURES 9 and 11. As shown in (*q*) of FIGURE 9, that portion of the waveform where the first and last pulses are directly compared is negative in polarity because the second trigger pulse is larger than the reduced magnitude delayed first trigger pulse. As shown in (*q*) of FIGURE 11, no direct comparison between pulses occurs when the last pulse is eliminated in the first pulse analyzing circuit, and the portion where direct comparison is possible remains positive in polarity throughout. The output from comparison means 66 is inverted and coupled to AND circuit 71, the waveform being as shown in (*r*) of FIGURES 9 and 11.

The pulse train received at delay line 43 and coupled from the delay line with a 7.2 microsecond delay [as shown in (*n*) of FIGURES 9 and 11] is coupled through narrow pulse generator 76 (where the pulses are delayed approximately 0.5 microsecond) and 0.3 microsecond delay line 77 and then coupled to AND circuit 73 [as shown in (*s*) of FIGURES 9 and 11]. AND circuit 73 also receives the output pulse train from 0.8 microsecond multivibrator 39 [as shown in (*g*) of FIGURES 8 and 10]. If coincidence occurs between the first pulse (delayed) and the last pulse (undelayed), an output pulse will be produced as shown in (*t*) of FIGURE 9. If, however, the last pulse was eliminated, then no output pulse will be produced by AND circuit 73, as shown by (*t*) of FIGURE 11.

The output pulse, if occurring, is coupled to AND circuit 71 where an output will be produced, as shown in (*u*) of FIGURE 9, if the pulse from AND circuit 73 is received coincidently with a positive portion of the output from comparison means 66 after being inverted [see (*r*) of FIGURE 9]. No positive portion due to direct comparison of pulses can occur in coincidence with the pulse from AND circuit 73 if the last pulse was eliminated. This is shown by (*u*) of FIGURE 11 [comparing (*r*) and (*t*) of FIGURE 11]. The output pulse, if occurring, at the output of AND circuit 71 is coupled to AND circuit 80 (mode A operation).

The pulse train received at delay line 43 is also coupled therefrom with a 7.8 microsecond delay (mode A operation). This delayed pulse train is inverted and coupled to AND circuit 80 as shown by (*v*) of FIGURES 9 and 11. If there is coincidence between the delayed last pulse and the pulse from AND circuit 71 an output pulse will be produced [as shown by (*w*) of FIGURE 9] to trigger the transponder transmitter to reply to the interrogation coded pulse signal. If no coincidence occurs then, of course, the transponder will not be triggered to reply, as shown by (*w*) of FIGURE 11.

It is to be noted that the pulse from AND circuit 71 is coupled to all AND circuits 80–83. Since this pulse will have a delay based upon the operational mode, coincidence will occur only at the AND circuit (80 to 83) having the pulse spacing of the mode utilized in interrogation. Hence the network of this invention is capable of automatically determining the mode used in interrogation and automatically replying in the same mode.

Figure 12:
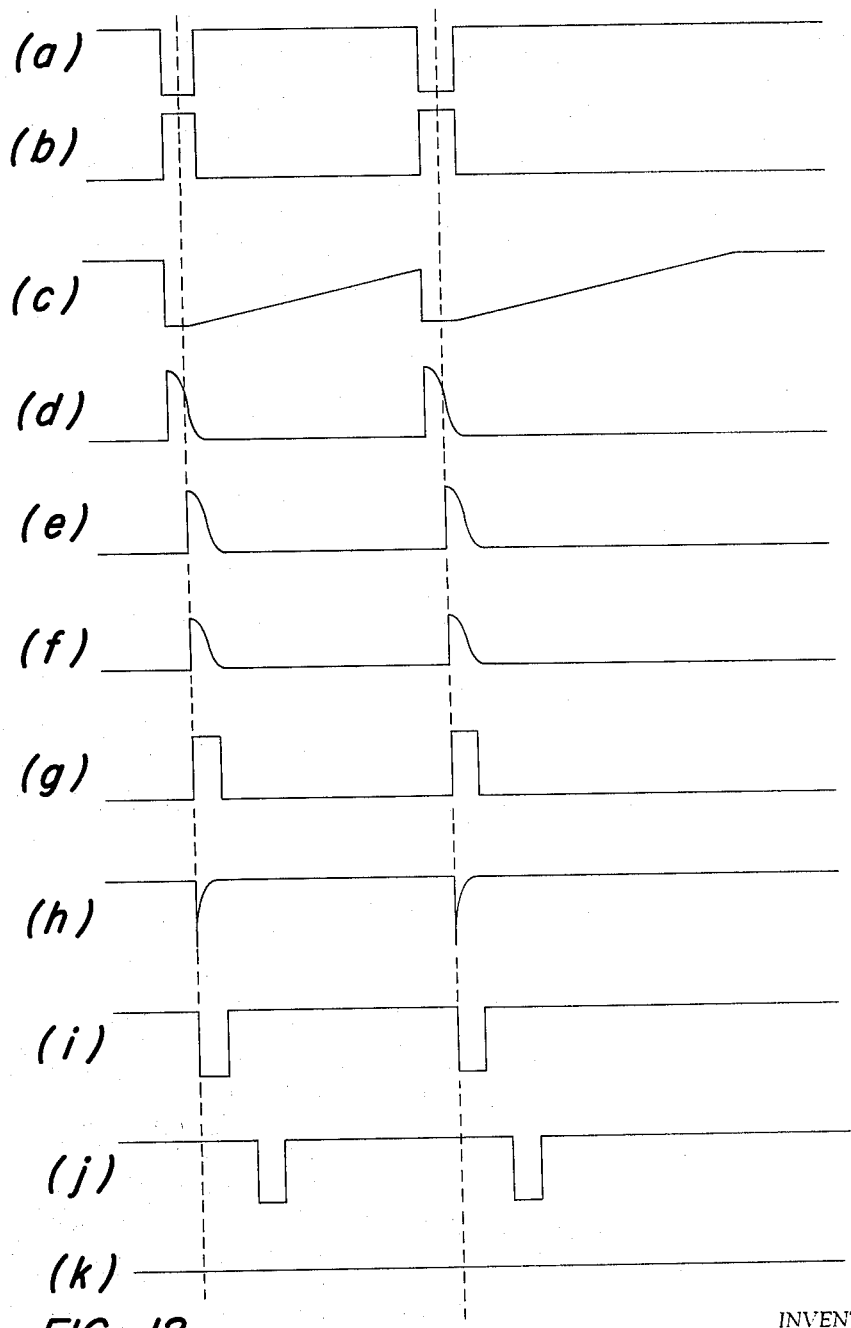
Figure 13:
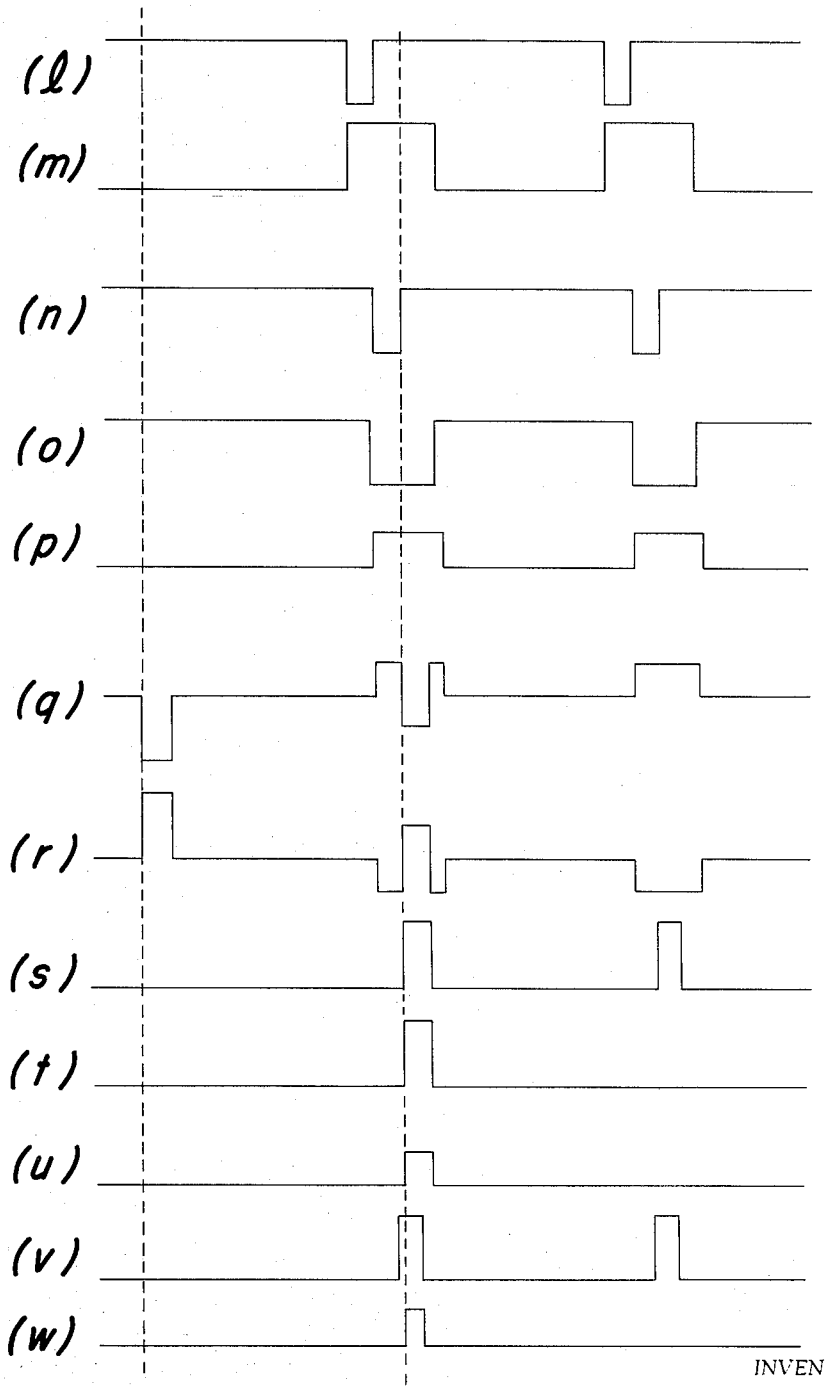
Figure 14:
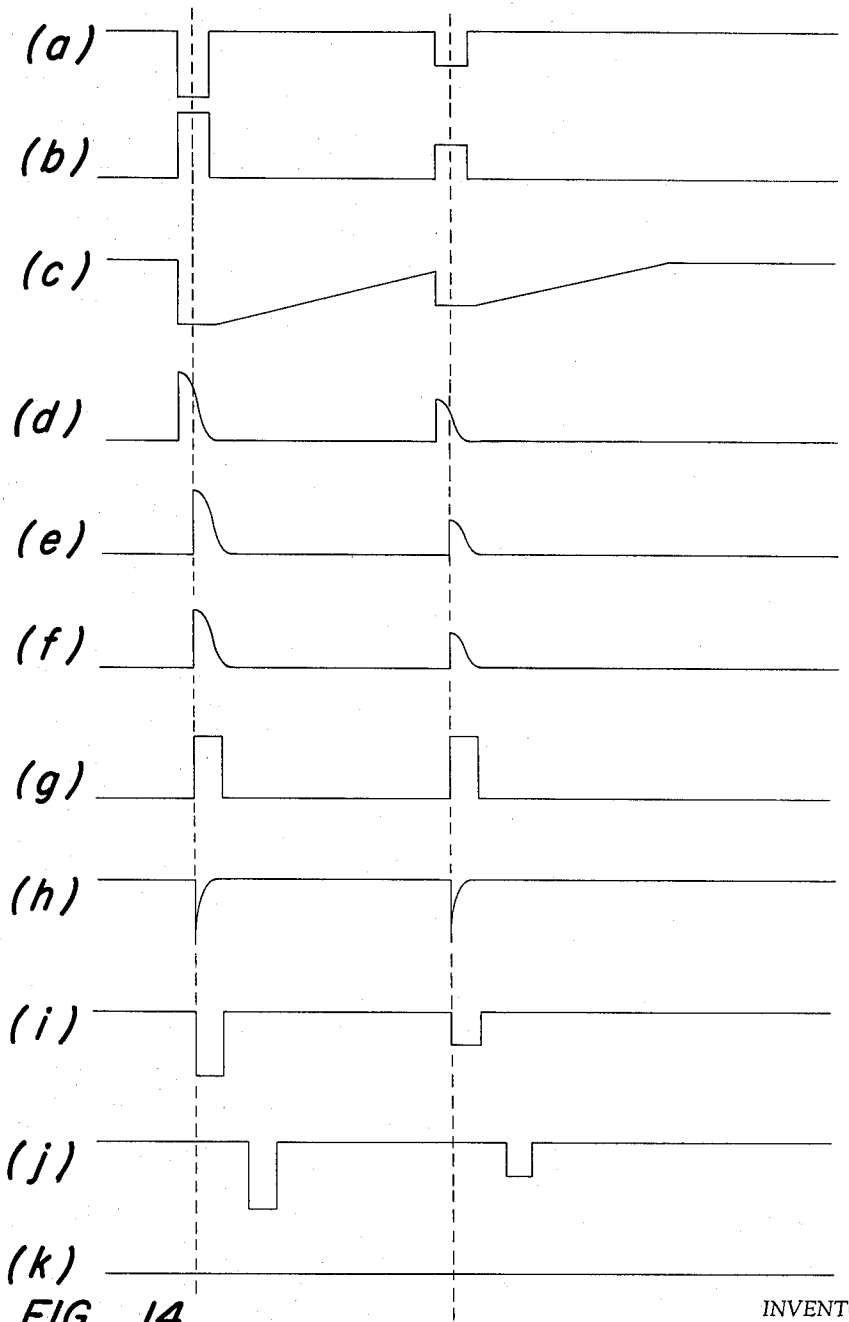
FIGURES 14 and 15 are a series of typical waveforms illustrating the operation of the network of this invention when a two pulse coded signal is received wherein the trigger pulse is from a side lobe of the directionally radiating antenna.
Figure 15:
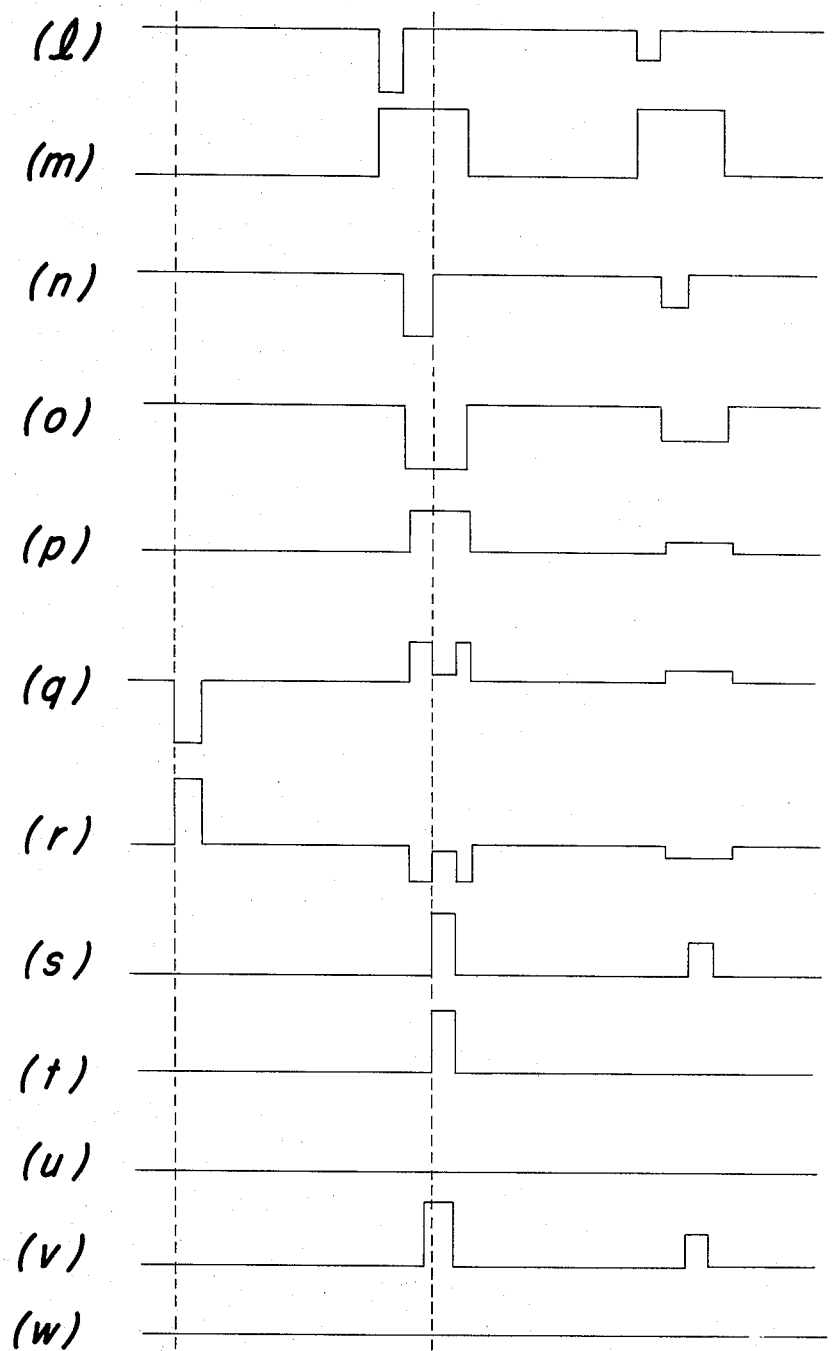

When a two pulse coded signal is received, as shown typically by (*a*) of FIGURES 12 and 14 (FIGURES 12 and 13 illustrate a two pulse coded signal where the first pulse is the control pulse and the second pulse is the trigger pulse from the main lobe of the directionally radiating antenna, while FIGURES 14 and 15 illustrate the same pulse arrangement where the trigger pulse originates from a side lobe of the directionally radiating antenna), this coded pulse signal will be processed in the same manner as that of a three pulse coded signal. However, since the two pulse coded signal has no third pulse occurring between the first and last pulses, both pulses will always be passed through the first pulse analyzing circuit. This is shown by (*a*) through (*j*) of FIGURES 12 and 14 for the two pulse coded signal operating in mode A with the control and trigger pulses timewise spaced 8 microseconds. In either case, there is obviously no coincidence at AND circuit 45 between the input pulses [see (*h*) and (*j*) of FIGURES 12 and 14] and hence 35 microsecond multivibrator 48 is never triggered to eliminate the last pulse, as indicated by (*k*) of FIGURES 12 and 14.

The pulse train coupled from delay line 43 delayed 6.4 microseconds [shown by (*l*) of FIGURES 13 and 15] is inverted and coupled to 2.5 microsecond multivibrator 55 to trigger the production of two pulses having a width of 2.5 microseconds and having leading edges spaced 8 microseconds, as shown in (*m*) of FIGURES 13 and 15. These pulses are then coupled to pulse stretching circuit 57 along with a negative polarity pulse train delayed 7.2 microseconds [see (*n*) of FIGURES 13 and 15] to produce stretched pulses of negative polarity at the output of pulse stretching circuit 57, as shown by (*o*) of FIGURES 13 and 15.

The pulses from pulse stretching circuit 57 are inverted, reduced in magnitude, and delayed approximately 0.2 microsecond at inverting and clipping circuit 64, as shown by (*p*) of FIGURES 13 and 15.

The delayed and amplitude reduced pulses are compared at comparison means 66 with the pulse train undelayed [see (*i*) of FIGURES 12 and 14]. If the trigger pulse originated from the main lobe of the directionally radiating antenna, then the waveform [as shown by (*q*) of FIGURE 13], will have a portion of negative polarity resulting from the direct comparison of the coincident first (delayed) and last (undelayed) pulses. If the trigger pulse originated from a side lobe, however, then there will be no portion having a negative polarity as a result of the direct comparison of coincident pulses [as shown by (*q*) of FIGURE 15]. The inverted difference output from comparison means 66 [see (*r*) of FIGURES 13 and 15] is then coupled to AND circuit 71.

The pulse train from delay line 43 delayed 7.2 microseconds is also coupled to narrow pulse generator 76 (when the pulse is delayed approximately 0.5 microsecond) and then through 0.3 microsecond delay line 77 to AND circuit 73 [see (*s*) of FIGURES 13 and 15] for comparison with the output pulses from 0.8 microsecond multivibrator 39 [see (*g*) of FIGURES 13 and 15].

Following this check of coincidence, the output pulse produced [see (*t*) of FIGURES 13 and 15] is coupled to AND circuit 71 to check for coincidence with the inverted output from comparison means 66 [see (*r*) of FIGURES 13 and 15]. Coincidence between positive pulses occurs at comparison means 66 only if the trigger pulse (undelayed) has an amplitude greater than the reduced amplitude of the stretched control pulse (delayed). When this occurs, an output pulse will be produced, as shown by (*u*) of FIGURE 13. If the trigger pulse has too small a relative amplitude, then no output pulse is produced, as shown by (*u*) of FIGURE 15.

If a pulse is produced, it is coupled to AND circuit 80 (mode A operation) to check for coincidence with the pulse train from delay line 43 delayed 7.8 microseconds [see (*v*) of FIGURES 13 and 15]. If coincidence occurs at AND circuit 80, an output trigger pulse is produced [as shown by (*w*) of FIGURE 13] to trigger a transponder reply. If no coincidence occurs, then no output pulse is produced [as shown by (*w*) of FIGURE 15] and a transponder reply is precluded.

A working embodiment of this invention may be constructed utilizing the following components. It is to be realized, however, that this invention is not meant to be limited to the particular components listed herein. The components are as follows utilizing reference numerals to designate the particular type or value utilized:

Transistors

2N328A—130; 2N337—218; 2N388—65, 72, 78, 79, 221, 342, 392; 2N404A—28, 29, 33, 46, 49, 85, 127, 229, 302, 338, 413, 419; 2N711A—47, 86, 141, 148, 158, 174, 188, 190, 191, 242, 263, 264, 311, 312; 2N1224—37, 41, 56, 63, 293, 298, 347, 351, 359, 384, 409, 424.

Diodes

1N191—118, 119, 198, 206, 249, 250, 276, 281, 287, 291, 423, 439, 440, 441, 458, 459; 1N270—140, 322, 356, 378, 379, 460; 1N627—238, 251, 260, 269, 271, 273, 307, 309, 325, 398, 399, 400; 1N904—195, 196, 200, 204, 209, 214, 215, 277, 316, 318, 332, 333, 421; 1N995—114, 152, 160, 168, 172, 244.

Resistors 68 ohms—126; 100 ohms—137; 150 ohms—297; 180 ohms—128, 467; 196 ohms—109; 464 ohms—234, 430; 470 ohms—224, 232, 388, 408, 470; 820 ohms— 231; 1000 ohms—107, 147, 155, 164, 181, 183, 184, 216, 237, 331, 335, 427; 1500 ohms—314; 1780 ohms—435; 2150 ohms—422; 2200 ohms—169, 170, 245, 266, 330; 3300 ohms—131; 3900 ohms—103, 115, 117, 120, 143, 176, 197, 201, 255, 257, 283, 425; 4220 ohms—429; 4640 ohms—348; 4700 ohms—110, 219, 361, 362; 5600 ohms— 105, 313; 5620 ohms—344; 6190 ohms—364; 6800 ohms—133 (thermistor); 6810 ohms—372; 8200 ohms— 124, 223, 252, 253, 365, 454; 8250 ohms—375, 376; 10K ohms—101, 123, 136 (thermistor), 144, 165, 205, 222, 226, 235, 240, 254, 265, 278, 280, 305, 369, 389, 402, 403, 416, 443, 444, 446, 462, 463; 12K ohms—102, 193, 299, 300, 304, 385, 387, 393, 395, 410, 411, 415; 15K ohms—106, 139, 442, 461; 18K ohms—199, 230, 471; 22K ohms—151, 159, 175, 182, 210, 243, 295, 303, 343, 349, 352, 381, 382, 386, 401, 414, 420, 469; 26.1K ohms—319; 27K ohms—294, 371, 394, 436; 31.6K ohms—363; 33K ohms—355; 39K ohms—134, 258, 282, 455; 46.4K ohms—274; 47K ohms—194, 288, 339, 465; 68K ohms—270, 272, 323; 82K ohms—317; 100K ohms—153, 308.

Potentiometers—Variable resistors

0–250 ohms—225; 0–2.5K ohms—116; 0–5K ohms— 341, 431; 0–10K ohms—360, 366; 0–25K ohms—135, 211.

Capacitors

15 $\mu\mu$fds.—207, 241; 18 $\mu\mu$fds.—367; 47 $\mu\mu$fds.—279; 56 $\mu\mu$fds.—149, 150, 208; 100 $\mu\mu$fds.—171, 203; 180 $\mu\mu$fds.—156, 321; 220 $\mu\mu$fds.—407; 390 $\mu\mu$fds.—129, 326, 447, 448; 470 $\mu\mu$fds.—334; 560 $\mu\mu$fds.—138; 2200 $\mu\mu$fds.— 275; 0.1 $\mu$fds.—146, 167, 189, 236, 246, 256, 285, 345, 434, 437, 445, 450, 452, 456, 472; 2.2 $\mu$fds.—100, 157, 163, 180, 185, 192, 220, 228, 233, 296, 301, 306, 329, 336, 340, 368, 370, 373, 377, 380, 390, 391, 396, 405, 412, 418, 426; 15 $\mu$fds.—104, 111, 112, 122, 132, 145, 227, 315, 357, 432, 466.

Inductors

39 $\mu$h.—428; 47 $\mu$h.—108; 220 $\mu$h.—239; 500 $\mu$h.— 166, 177; 1000 $\mu$h.—202, 267.

From the foregoing, it should be realized that the suppression network of this invention provides an improved means for receiving either a two pulse or a three pulse coded signal, decoding the same and automatically replying the same mode if the pulses of the coded signal are properly spaced and have predetermined relative amplitudes whereby undesirable triggering such as due to pulses from a side lobe of the directionally radiating antenna of the interrogation radar system is precluded.

What is claimed as my invention is:

1. A suppression network for receiving a coded signal that includes a plurality of pulses at least one of which originated from a directionally radiating antenna, the first and last pulses of said coded signal being spaced a predetermined time interval, said suppression network comprising: first pulse analyzing means including phase splitting and coincidence gating circuitry for receiving said coded signal and passing only two pulses thereof at least one of which is said pulse originating from said directionally radiating antenna; delay means for receiving said two pulses from said first pulse analyzing means and delaying the same for a preselected period of time; means including amplitude reduction means for receiving the delayed pulses from said delay means and reducing the amplitude of said pulses by a predetermined amount; and second pulse analyzing means including further coincidence gating means and pulse amplitude comparison means connected with said amplitude reduction means for receiving said delayed pulses therefrom and to said first pulse analyzing means for receiving said two pulses therefrom substantially undelayed, said second pulse analyzing means precluding an output from said network unless said two pulses are timewise spaced said predetermined time interval and unless said pulse originating from said directionally radiating antenna has an amplitude greater than that of said reduced amplitude delayed pulses.

2. The suppression network of claim 1 wherein said amplitude reduction means includes a clipping circuit for reducing the amplitude of said delayed pulses a predetermined number of decibels.

3. The suppression network of claim 1 wherein said first pulse analyzing circuit includes means for determining the presence of a control pulse in said received coded signal occurring at a preselected time after said first pulse but before said predetermined time interval has expired and eliminating said pulse if below a predetermined minimum amplitude determined by the timewise spacing and amplitude relationship between said control pulse and said first pulse; normally open gate means for receiving the output from said last named means;

means including a first AND circuit for receiving the output from said normally open gate means and said received coded signal; second delay means connected with said first AND circuit for delaying said pulses therefrom for an interval substantially equal to said preselected time between said first pulse and said control pulse; a second AND circuit; means for coupling the output pulses from said normally open gate means and said output pulses from said second delay means to said second AND circuit whereby said second AND circuit receives said control pulse, if not eliminated, in coincidence with said first pulse; and means responsive to an output from said second AND circuit for closing said gate means and precluding pulse passage therethrough for a time interval greater than said predetermined time interval.

4. The suppression network of claim 3 wherein said first named means therein includes a charging capacitor and means for discharging said charging capacitor linearly whereby the amplitude of said control pulse, if occurring, is compared with the charge on said charging capacitor, the amount of charge remaining at the occurrence of said control pulse determining said predetermined minimum amplitude below which said control pulse is eliminated.

5. A suppression network, comprising: input means for receiving a coded input signal having at least first and last pulses one of which is a trigger pulse originating from a directionally radiating antenna; means connected to said input means for determining if a middle pulse is included in said coded signal and eliminating said middle pulse unless the amplitude of said middle pulse is greater than a predetermined minimum amplitude determined by the timewise spacing and amplitude relationship between said control pulse and the first pulse of said received coded signal; gate means receiving the pulse output from said last named means, said gate means normally passing said pulse output therefrom; means including a first AND circuit connected with said input means and said gate means to receive the outputs therefrom; a delay line connected with the output of said first AND circuit; a second AND circuit; means for coupling the pulse output from said gate means to said second AND circuit; means for coupling the pulse output from said delay line delayed a predetermined time interval to said second AND circuit whereby said second AND circuit receives the first pulse of said coded signal in coincidence with said middle pulse, if occurring; pulse inhibiting means responsive to receipt of a pulse output from said second AND circuit and connected to said gate means to preclude passage of the last pulse of said received coded signal through said gate means until after the last pulse of said coded signal has occurred; means for coupling a delayed coded signal from said delay line, said coded signal being delayed a preselected length of time; amplitude reduction means connected with said last named means for receiving said delayed pulse output therefrom and reducing the amplitude of each delayed pulse a predetermined number of decibels; comparison means for receiving the pulse output from said amplitude reduction means and for receiving the pulse output from said first AND circuit so that said first and last pulses of said received coded signal are compared in amplitude, said comparison means producing a difference output; means for receiving the output from said comparison means and the pulse output from said gate means and producing an output pulse only if the last pulse of said received coded signal in the pulse output from said first AND circuit appears in coincidence and with the same polarity with a portion of said output from said comparison means; and output means connected to said last named means for coupling an output pulse therefrom.

6. A suppression network, comprising: phase splitting means for receiving an input coded signal having either two or three pulses, said phase splitting means having a pair of outputs, the pulse output from each of which are opposite in polarity to the output pulses from the other; means connected to one output of said phase splitting means for receiving the coded signal therefrom and comparing the first and second pulses of a three pulse coded signal and eliminating said second pulse if below a predetermined minimum amplitude determined by the timewise spacing and amplitude relationship between said pulses; a transistor gate circuit including a plurality of transistors, one of which is connected to receive the pulse output from said last named means; pulse shaping multivibrator means connected to receive the pulse output from said transistor gate circuit and produce an output pulse train timewise spaced substantially the same as that of the input pulses thereto but accurately controlled as to width; a first AND circuit connected to said pulse shaping multivibrator means and with said other output of said phase splitting means; a delay line connected to the output of said first AND circuit; means for tapping said delay line so that the pulse output therefrom is delayed for a period of time substantially equal to the time spacing between the first and middle pulses of a received three pulse coded signal; a second AND circuit connected to said last named means; means connecting said pulse shaping multivibrator means to said second AND circuit; blanking multivibrator means connected to said second AND circuit and to another transistor of said gate means, said blanking multivibrator means in response to an output pulse from said second AND circuit becoming operative to preclude passage of pulses through said gate means for a period of time greater than the time duration required for said input coded signal; amplitude reduction means for reducing the amplitude of received pulses a predetermined number of decibels; means for tapping said delay line and coupling said output pulses therefrom to said amplitude reduction means so that said pulses are timewise spaced a period of time substantially equal to the time spacing between the first and last pulses of a received coded signal; a resistive adder for receiving the output of said amplitude reduction means and said first AND circuit, said adder producing a difference output; a third AND circuit; means connecting said third AND circuit with said delay line and said pulse shaping multivibrator means so that the first and last pulses of a received coded signal are coincident at said third AND circuit; a fourth AND circuit connected to said adder and said third AND circuit to receive the output from each; and output means for coupling a triggering pulse from said network.

7. A suppression network, comprising: phase splitting means for receiving an input coded signal having either two or three pulses, said phase splitting means having a pair of outputs, the pulse output from each of which are opposite in polarity to the pulse output from the other; minimum sensitivity means connected to one output from said phase splitting means and blocking passage of a received coded signal therethrough unless said pulses exceed a predetermined minimum amplitude; means connected to said minimum sensitivity means for receiving the received coded signal coupled therethrough and comparing the first and second pulses of a three pulse coded signal and eliminating said second pulse if below a predetermined minimum amplitude determined by the timewise spacing and amplitude relationship between said pulses; a transistor AND-INHIBIT circuit including four transistors, the first of which is connected to receive the pulse output from said last named means; means directly connecting said other output of said phase splitting means to the second transistor of said AND-INHIBIT circuit; a spike elimination delay line connected to said other output of said phase splitting circuit; wide pulse rejection means; means connecting an output of said spike elimination delay line to said wide pulse noise rejection means; means connecting the output of said wide pulse noise rejection means to the third transistor of said AND-INHIBIT circuit; wave shaping multivibrator means connected to receive the output from said AND-INHIBIT circuit for producing a controlled width pulse output, said pulses being timewise spaced substantially the same as the input pulses to said multivibrator means; a first diode AND circuit connected to receive the output from said pulse shaping multivibrator means and said spike elimination delay line; a delay line connected to the output of said first diode AND circuit; a second diode AND circuit; narrow pulse generating means connected to receive the output from said pulse shaping multivibrator means and having an output connected to said second diode AND circuit; means for tapping said delay line so that the pulse output therefrom is delayed for a time period substantially equal to the time spacing between the first and middle pulses of a received three pulse coded signal, said delayed pulse output being coupled to said second diode AND circuit; a blanking multivibrator connected to the output of said second diode AND circuit and responsive to an output therefrom providing a blanking output pulse having a time duration greater than that required for all pulses of said coded signal to occur; means connecting the output of said blanking multivibrator to the fourth transistor of said AND-INHIBIT circuit to block all pulse passage therethrough while said blanking pulse is coupled from said blanking multivibrator; means for tapping said delay line so that the pulse output coupled from said means is delayed for a time period slightly less than the spacing between the first and last pulses of a received coded signal; first signal inverting means connected to said last named means; means connected to said first signal inverting means for increasing the width of said delayed pulses coupled from said delay line through said first signal inverting means; amplitude reduction and second signal inverting means connected to receive the output from said pulse stretching circuit for reducing the amplitude of said delayed pulses a predetermined number of decibels; a resistive adder for receiving the output of said amplitude reduction means and said first AND circuit whereby the first and last pulses of a received coded signal are compared, said adder producing a difference output; third signal inverting means connected to the output of said adder; a third diode AND circuit; means connecting said third diode AND circuit with said delay line so that the delayed pulse output coupled to said third diode AND circuit is delayed a time period substantially equal to that of the spacing between the first and last pulses of a received coded signal; means connecting said third diode AND circuit to said pulse shaping multivibrator means; a fourth diode AND circuit for receiving the output from said third diode AND circuit and the output from said third signal inverting means; and means connected to the output of said fourth diode AND circuit for coupling a triggering output pulse from said suppression network.

8. An automatic mode selecting suppression network, comprising: first pulse analyzing means including phase splitting and coincidence gating means for receiving a coded signal and passing only two pulses thereof at least one of which originated from a directionally radiating antenna; delay means for receiving said pulses from said first pulse analyzing means, said delay means having means whereby each said input pulse train is tapped from said delay means with a plurality of predetermined time interval delay periods; a diode OR circuit for receiving the delayed output pulse trains from said delay means; means including amplitude reduction means connected with said diode OR circuit to receive the output pulse train therefrom; second pulse analyzing means including further coincidence gating means and amplitude comparison means connected to said amplitude reduction means for receiving said pulse trains therefrom, said second pulse analyzing means producing an output only if the delayed pulses of pulse trains are timewise spaced one of said predetermined time intervals and unless said pulse originating from said directionally radiating antenna has an amplitude greater than said reduced amplitude delayed pulses; and means connected to the output of said second pulse analyzing means and to said delay means for automatically causing an output from said suppression network to be in the same mode as that of said received coded signal.

9. The automatic mode selecting suppression network of claim 8 wherein said last named means includes a plurality of AND circuits each of which is connected to said second pulse analyzing means, and means for coupling said output pulse train from said delay means to each said AND circuit with a predetermined different time delay to each, said predetermined different time delays being substantially equal to the timewise spacing that can occur between the first and last pulses of a received coded signal for all selectable modes, whereby an output pulse is automatically provided only from that one of said AND circuits receiving the pulse train delayed a time interval substantially the same as that of the timewise spacing of the coded signal received.

References Cited by the Examiner
UNITED STATES PATENTS

| | | | |
|---|---|---|---|
| 3,025,470 | 3/1962 | Sarzin et al. | 329—107 |
| 3,032,757 | 5/1962 | Majerus et al. | 343—6.8 |
| 3,048,789 | 8/1962 | Herzog | 329—107 |
| 3,087,152 | 4/1963 | Noyes | 343—6.8 |
| 3,092,830 | 6/1963 | Clock et al. | 343—6.8 |
| 3,142,806 | 7/1964 | Fernandez | 329—107 |

CHESTER L. JUSTUS, *Primary Examiner.*

E. T. CHUNG, P. M. HINDERSTEIN,
*Assistant Examiners.*